US008054906B2

(12) United States Patent
Choi et al.

(10) Patent No.: US 8,054,906 B2
(45) Date of Patent: Nov. 8, 2011

(54) DIGITAL BROADCASTING SYSTEM AND DATA PROCESSING METHOD

(75) Inventors: In Hwan Choi, Gyeonggi-do (KR); Jong Yeul Suh, Seoul (KR); Chul Soo Lee, Seoul (KR); Jae Hyung Song, Seoul (KR); Jin Pil Kim, Seoul (KR)

(73) Assignee: LG Electronics, Inc., Seoul (KR)

(*) Notice: Subject to any disclaimer, the term of this patent is extended or adjusted under 35 U.S.C. 154(b) by 547 days.

(21) Appl. No.: 12/234,882

(22) Filed: Sep. 22, 2008

(65) Prior Publication Data

US 2009/0252253 A1 Oct. 8, 2009

Related U.S. Application Data

(60) Provisional application No. 60/974,084, filed on Sep. 21, 2007, provisional application No. 60/977,379, filed on Oct. 4, 2007, provisional application No. 61/042,243, filed on Apr. 3, 2008, provisional application No. 61/044,504, filed on Apr. 13, 2008, provisional application No. 61/076,686, filed on Jun. 29, 2008.

(30) Foreign Application Priority Data

Sep. 18, 2008 (KR) ........................ 10-2008-0091840

(51) Int. Cl.
*H03C 1/52* (2006.01)
*H04L 27/02* (2006.01)

(52) U.S. Cl. ....................................................... 375/270

(58) Field of Classification Search ................... 375/270
See application file for complete search history.

(56) References Cited

U.S. PATENT DOCUMENTS

| | | | |
|---|---|---|---|
| 5,619,386 A | 4/1997 | Voorman et al. | |
| 6,775,800 B2 | 8/2004 | Edmonston et al. | |
| 2004/0081199 A1 | 4/2004 | Lopez et al. | |

(Continued)

FOREIGN PATENT DOCUMENTS

JP 2003032640 1/2003

(Continued)

OTHER PUBLICATIONS

ETSI "Digital Video Broadcasting (DVB); DVB-H Implementation Guidelines" ETSI TR 102 377 v1.2.1, Nov. 2005.

(Continued)

*Primary Examiner* — Shuwang Liu
*Assistant Examiner* — Nader Bolourchi
(74) *Attorney, Agent, or Firm* — Lee, Hong, Degerman, Kang & Waimey

(57) ABSTRACT

A digital broadcasting system and method of processing data therein are disclosed. The present invention includes a baseband processor unit receiving a broadcast signal including mobile service data and main service data, wherein the mobile service data can configure an RS frame and wherein the RS frame includes at least one of the mobile service data and a notification message and at least one of a first signaling information describing signaling information of a virtual channel for transmitting the mobile service data and a second signaling information describing signaling information on a notification channel for transmitting the notification message, a management processor unit accessing the notification message by parsing the second signaling information from the RS frame, the management processor unit processing the accessed notification message, the management processor unit storing the processed notification message in a storage device, and a presentation processor unit outputting the processes notification message to an output device.

18 Claims, 40 Drawing Sheets

U.S. PATENT DOCUMENTS

| | | | | |
|---|---|---|---|---|
| 2005/0060760 | A1 | 3/2005 | Jaffe et al. | |
| 2006/0194536 | A1 | 8/2006 | Kim et al. | |
| 2007/0003217 | A1 | 1/2007 | Jang | |
| 2007/0207727 | A1 | 9/2007 | Song et al. | |
| 2008/0225799 | A1 | 9/2008 | Lee et al. | |
| 2008/0239161 | A1 | 10/2008 | Kim et al. | |
| 2008/0240065 | A1 | 10/2008 | Choi et al. | |
| 2008/0240293 | A1 | 10/2008 | Kim et al. | |
| 2008/0240297 | A1 | 10/2008 | Kim et al. | |
| 2008/0246881 | A1 | 10/2008 | Kim et al. | |
| 2008/0246887 | A1 | 10/2008 | Lee et al. | |
| 2009/0028081 | A1 | 1/2009 | Song et al. | |
| 2009/0028272 | A1 | 1/2009 | Song et al. | |
| 2009/0080405 | A1 | 3/2009 | Lee et al. | |
| 2009/0252253 | A1 | 10/2009 | Choi et al. | |
| 2010/0257570 | A1* | 10/2010 | Song et al. | 725/110 |
| 2010/0260286 | A1* | 10/2010 | Song et al. | 375/295 |
| 2010/0284473 | A1* | 11/2010 | Suh et al. | 375/240.26 |
| 2010/0287444 | A1* | 11/2010 | Song et al. | 714/758 |
| 2010/0322344 | A1* | 12/2010 | Lee et al. | 375/295 |

FOREIGN PATENT DOCUMENTS

| | | |
|---|---|---|
| KR | 10-1998-0023115 | 7/1998 |
| KR | 10-2004-0013153 | 2/2004 |
| KR | 1020050041489 | 5/2005 |
| KR | 10-2005-0062867 | 6/2005 |
| KR | 10-2005-0093921 | 9/2005 |
| KR | 10-2006-0017695 | 2/2006 |
| KR | 1020060065435 | 6/2006 |
| KR | 10-2006-0095235 A | 8/2006 |
| KR | 10-2007-0034215 | 3/2007 |
| KR | 10-2007-0079328 A | 8/2007 |
| WO | 2007/089108 | 8/2007 |
| WO | 2009/038402 | 3/2009 |
| WO | 2009/038405 | 3/2009 |

OTHER PUBLICATIONS

ATSC Standard "Program and System Information Protocol for Terrestrial Broadcast and Cable (Revision B)" A/65B, Mar. 18, 2003.

DVB Document A092 Rev. 2 (Draft v. 1.3.1), DVB-H Implementation Guidelines, May 2007, all pages, (www.dvb-h.org).

ETSI TS 102 470 V1.1.1, Digital Video Broadcasting (DVB); IP Datacast over DVB-H: Program Specific Information (PSI)/Service Information (SI), Apr. 2006, all pages.

OMA-TS-BCAST__SERVICES-V1__0-20070529-C, Mobile Broadcast Services Candidate Version 1.0, May 29, 2007, all pages.

ETSI EN 300 401 V1.4.1, Radio Broadcasting Systems; Digital Audio Broadcasting (DAB) to Mobile, Portable and Fixed Receivers; Jun. 2006.

* cited by examiner

FIG. 15

| Syntax | # of bits |
|---|---|
| FIC_Segment () { | |
| FIC_type | 2 |
| Reserved | 5 |
| error_indicator | 1 |
| FIC_seg_number | 4 |
| FIC_last_seg_number | 4 |
| for (i=0:i<N:i++) { | |
| data_byte | 8 |
| } | |
| } | |

FIG. 16

| | Syntax | # of bits |
|---|---|---|
| First region | if (FIC_seg_number == 0) { | |
| | current_next_indicator | 1 |
| | Reserved | 2 |
| | ESG_version | 5 |
| | transport_stream_id | 16 |
| | } | |
| second region | while ( ensemble_id ! = 0xFF ) | |
| | ensemble id | 8 |
| | reserved | 3 |
| | SI_version | 5 |
| | num_channel | 3 |
| third region | for (i=0:i< num_channel:i++) { | |
| | channel_type | 5 |
| | channel_activity | 2 |
| | CA_indicator | 1 |
| | Stand_alone_Semce_indtcator | |
| | major_channel_num | 8 |
| | minor_channel_num | 8 |
| | } | |
| | } // end of while | |
| | } | |

FIG. 17

| Syntax | No. of Bits | Format |
|---|---|---|
| service_map_table_section() { | | |
| table_id | 8 | TBD |
| section_syntax_indicator | 1 | '0' |
| private_indicator | 1 | '1' |
| reserved | 2 | '11' |
| section_length | 12 | uimsbf |
| reserved | 3 | '111' |
| version_number | 5 | uimsbf |
| section_number | 8 | uimsbf |
| last_section_number | 8 | uimsbf |
| SMT_protocol_version | 8 | uimsbf |
| ensemble_id | 8 | uimsbf |
| num_channels | 8 | uimsbf |
| for (i=0; i<num_channels; i++) | | |
| { | | |
| major_channel_number | 8 | uimsbf |
| minor_channel_number | 8 | uimsbf |
| short_channel_name | 8*8 | |
| service_id | 16 | uimsbf |
| service_type | 6 | uimsbf |
| virtual_channel_activity | 2 | uimsbf |
| num_components | 5 | uimsbf |
| IP_version_flag | 1 | bslbf |
| source_IP_address_flag | 1 | bslbf |
| virtual_channel_target_IP_address_flag | 1 | bslbf |
| if (source_IP_address_flag) | | |
| source_IP_address | 32 or 128 | uimsbf |
| if (virtual_channel_target_IP_address_flag) | | |
| virtual_channel_target_IP_address | 32 or 128 | uimsbf |
| for (j=0; j<num_components; j++) | | |
| { | | |
| RTP_payload_type | 7 | uimsbf |
| component_target_IP_address _flag | 1 | bslbf |
| if (component_target_IP_address _flag) | | |
| component_target_IP_address | 32 or 128 | uimsbf |
| reserved | 2 | '11' |
| port_num_count | 6 | uimsbf |
| target_UDP_port_num | 16 | uimsbf |
| descriptors_length | 8 | uimsbf |
| for (k=0; k<descriptors_length; k++) | | |
| { | | |
| component_level_descriptor() | | |
| } | | |
| } | | |
| descriptors_length | 8 | uimsbf |
| for (m=0; m<descriptors_length; m++) | | |
| { | | |
| virtual_channel_level_descriptor() | | |
| } | | |
| } | | |
| descriptors_length | 8 | uimsbf |
| for (n=0; n<descriptors_length; n++) { | | |
| { | | |
| ensemble_level_descriptor() | | |
| } ensemble_level_descriptor() | | |
| } | | |

FIG. 18

| Syntax | No. of Bits | Format |
|---|---|---|
| MH_audio_descriptor() { | | |
| descriptor_tag | 8 | TBD |
| descriptor_length | 8 | uimsbf |
| channel_configuration | 8 | uimsbf |
| reserved | 5 | '11111' |
| sample_rate_code | 3 | uimsbf |
| reserved | 2 | '11' |
| bit_rate_code | 6 | uimsbf |
| ISO_639_language_code | 3*8 | uimsbf |
| } | | |

FIG. 19

| Syntax | No. of Bits | Format |
|---|---|---|
| MH_RTP_payload_type_descriptor() { | | |
| descriptor_tag | 8 | TBD |
| descriptor_length | 8 | uimsbf |
| reserved | 1 | '1' |
| RTP_payload_type | 7 | uimsbf |
| MIME_type_length | 8 | uimsbf |
| MIME_type() | var | |
| } | | |

FIG. 20

| Syntax | No. of Bits | Format |
|---|---|---|
| MH_current_event_descriptor() { | | |
| descriptor_tag | 8 | TBD |
| descriptor_length | 8 | uimsbf |
| current_event_start_time | 4*8 | uimsbf |
| current_event_duration | 3*8 | uimsbf |
| Title_length | 8 | uimsbf |
| Title_text() | var | |
| } | | |

FIG. 21

| Syntax | No. of Bits | Format |
|---|---|---|
| MH_next_event_descriptor() { | | |
| descriptor_tag | 8 | TBD |
| descriptor_length | 8 | uimsbf |
| next_event_start_time | 4*8 | uimsbf |
| next_event_duration | 3*8 | uimsbf |
| title_length | 8 | uimsbf |
| title_text() | var | |
| } | | |

FIG. 22

| Syntax | No. of Bits | Format |
|---|---|---|
| MH_system_time_descriptor() { | | |
| descriptor_tag | 8 | TBD |
| descriptor_length | 8 | uimsbf |
| system_time | 32 | uimsbf |
| GPS_UTC_offset | 8 | uimsbf |
| time_zone_offset_polarity_rate_code | 1 | bslbf |
| time_zone_offset | 31 | uimsbf |
| daylight_savings() | 16 | uimsbf |
| time_zone() | 5*8 | |
| } | | |

FIG. 26

| | Syntax | No. of bits | Format |
|---|---|---|---|
| | FIC-Segment() { | | |
| Header | FIC_Type | 2 | '00' |
| Header | Reserved | 1 | '1' |
| Header | ESG_Version | 5 | uimsbf |
| Header | Transport_Stream_ID | 16 | uimsbf |
| Header | FIC_seg_Number | 4 | uimsbf |
| Header | FIC_last_seg_Number | 4 | uimsbf |
| | for(i=0; i<NumEnsembles; i++) { | | |
| | Ensemble_id | 8 | uimsbf |
| | Reserved | 3 | '111' |
| | SI_Version | 5 | uimsbf |
| | NumChannels | 8 | uimsbf |
| | for (j=0; j<NumChannels; j++) { | | |
| | Channel_type | 3 | uimsbf |
| | Emergency_Indicator | 1 | bslbf |
| | Channel_Activity | 2 | uimsbf |
| | CA_Indicator | 1 | bslbf |
| | Stand_alone_Service_Indicator | 1 | bslbf |
| | major_channel_num | 8 | uimsbf |
| | minor_channel_num | 8 | uimsbf |
| | } | | |
| | } | | |
| | } | | |

FIG. 27

| Channel_type | Meaning |
|---|---|
| '000' | MH Video + Audio Channel |
| '001' | MH Video + Audio + Data Channel |
| '010' | MH Audio only Channel |
| '011' | MH Data only Channel |
| '100' | MH File Download Channel |
| '101' | MH ESG Delivery Channel |
| '110' | MH Notification Channel |
| '111' | Reserved |

FIG. 28

| Channel_Activity | Meaning |
|---|---|
| '00' | This channel is currently active and providing service(s).<br>Also, the guide information for this channel is provided through Electronic Service Guide. |
| '01' | This channel is currently inactive and NOT providing service(s).<br>However, the guide information for this channel may be provided through Electronic Service Guide.<br>An MH receiver shall not be able to tune to this particular channel, while it may provide the guide information for this channel to the user. |
| '10' | This channel is hidden. Currently inactive and NOT providing service(s) for general consumption. Also, the guide information for this channel is not provided.<br>An MH receiver if it's not a designated receiver for a designated service through a hidden channel shall neither be able to tune to this particular channel nor be able to provide guide information for this channel to the user. |
| '11' | This channel is software download channel.<br>An MH receiver shall neither be able to tune to this particular for a general service consumption nor be able to provide guide information for this channel to the user.<br>The software download may be performed in background. |

FIG. 31

| Type Indicator | Meaning |
|---|---|
| '000' | The payload of this MH-TP includes one or more IP Datagram(s). In this case, the "Pointer Field" points the starting point of the first newly started IP Datagram. |
| '001' | The payload of this MH-TP includes one or more SI Table(s). In this case, the "Pointer Field" points the starting point of the first newly started SI Table. |
| '010' | The payload of this MH-TP includes one or more SI Table(s), followed by one or more IP Datagram(s). In this case, the "Pointer Field" points the starting point of the first newly started IP Datagram. "Stuffing" is not allowed in this case. |
| '011 ~ 111' | Reserved for future use. |

FIG. 33

| Syntax | No. of bits | Format |
|---|---|---|
| service_map_table_section { | | |
| table_id | 8 | |
| section_syntax_indicator | 1 | '0' |
| private_indicator | 1 | '1' |
| reserved | 2 | '11' |
| version_number | 5 | uimsbf |
| section_number | 8 | uimsbf |
| last_section_number | 8 | uimsbf |
| ensemble_id | 8 | uimsbf |
| for (i=0; i<NumChannels; i++) | | |
| { | | |
| transport_stream_id | 16 | uimsbf |
| source_id | 16 | uimsbf |
| major_channel_number | 8 | uimsbf |
| minor_channel_number | 8 | uimsbf |
| ESG_requirement_flag | 1 | bslbf |
| num_streams | 6 | uimsbf |
| IP_version_flag | 1 | bslbf |
| target_IP_address | 32 or 128 | uimsbf |
| for (j=0; j<num_streams; j++) | | |
| { | | |
| stream_type | 8 | uimsbf |
| target_port_num | 8 | uimsbf |
| if (stream_type =="Audio") | | |
| ISO_639_language_code | 8*3 | uimsbf |
| } | | |
| descriptors_length | 8 | uimsbf |
| for (i=0; i<N; i++) { | | |
| descriptor() | | |
| } | | |
| additional_descriptors_length | 8 | uimsbf |
| for (j=0; j<N; j++) { | | |
| additional_descriptor() | | |
| } | | |
| } | | |
| } | | |

FIG. 34

| Syntax | No. of bits | Format |
|---|---|---|
| Notification_Access_table_section { | | |
| table_id | 8 | |
| section_syntax_indicator | 1 | '0' |
| private_indicator | 1 | '1' |
| reserved | 2 | '11' |
| version_number | 5 | uimsbf |
| section_number | 8 | uimsbf |
| last_section_number | 8 | uimsbf |
| ensemble_id | 8 | uimsbf |
| NumNotifSession | 8 | uimsbf |
| for (i=0; NumNotifSession; i++) | | |
| { | | |
| transport_stream_id | 16 | uimsbf |
| source_id | 16 | uimsbf |
| Notification_Type | 7 | uimsbf |
| Emergency | 1 | bslbf |
| reserved | 1 | bslbf |
| NumNotifMsg | 6 | uimsbf |
| IP_version_flag | 1 | bslbf |
| target_IP_address | 32 or 128 | uimsbf |
| for (j=0; j<NumNotifMsg; j++) | | |
| { | | |
| NotifMsgType | 8 | uimsbf |
| target_port_num | 8 | uimsbf |
| if (NotifMsgType =="Audio") | | |
| ISO_639_language_code | 8*3 | uimsbf |
| } | | |
| descriptors_length | 8 | uimsbf |
| for (i=0; i<N; i++) { | | |
| descriptor() | | |
| } | | |
| additional_descriptors_length | 8 | uimsbf |
| for (j=0; j<N; j++) { | | |
| additional_descriptor() | | |
| } | | |
| } | | |
| } | | |

FIG. 35

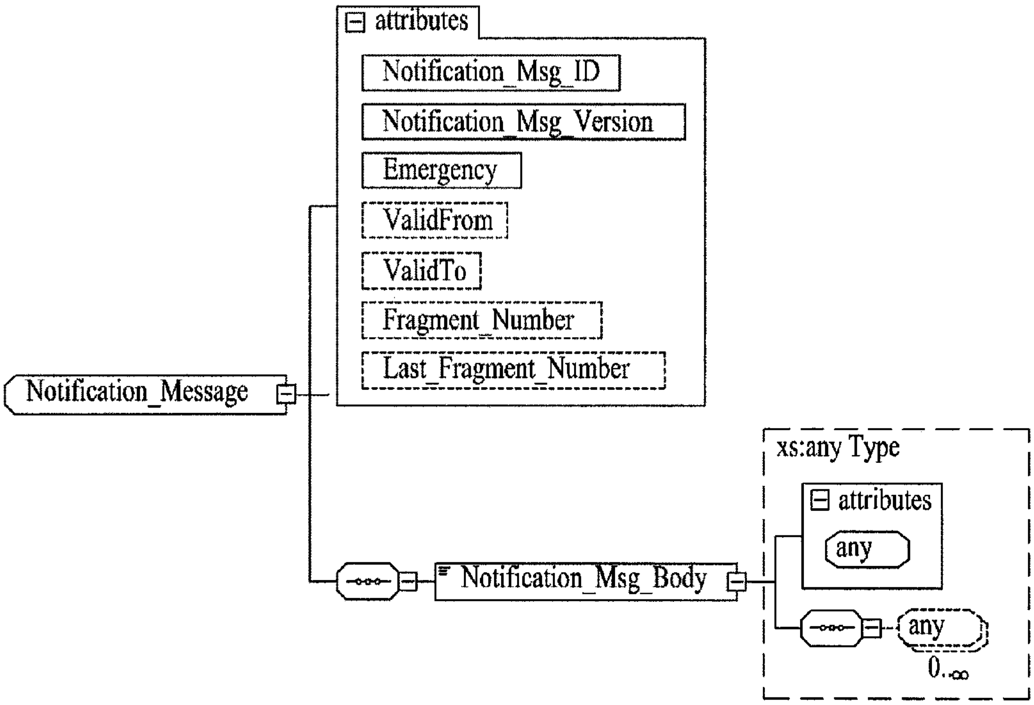

FIG. 36

```
<complexType name="Notification_Message">
  <sequence>
    <element name="Notification_Msg_Body" type="anyType"/>
  </sequence>
  <attribute name="Notification_Msg_ID" type="unsignedShort" use="required"/>
  <attribute name="Notification_Msg_Version" type="unsignedShort" use="required"/>
  <attribute name="Emergency" type="boolean" use="required"/>
  <attribute name="ValidFrom" type="dateTime"/>
  <attribute name="ValidTo" type="dateTime"/>
  <attribute name="Fragment_Number" type="unsignedShort"/>
  <attribute name="Last_Fragment_Number" type="unsignedShort"/>
</complexType>
```

FIG. 40

```
<element name="Emergency_Alert">
 <complexType>
  <complexContent>
   <extension base="Notification_Message">
    <sequence>
     <element name="EAS_Nature">
      <complexType>
       <attribute name="EAS_Originator_Code" type="string" use="required"/>
       <attribute name="EAS_Event_Code" type="string" use="required"/>
       <attribute name="Alert_Msg_Time_remaining" type="unsignedByte"/>
       <attribute name="Start_Time" type="dateTime" use="required"/>
       <attribute name="Duration" type="duration" use="required"/>
      </complexType>
     </element>
     <element name="EAS_Body">
      <complexType>
       <sequence>
        <element name="Alert_Text" type="string" minOccurs="0"/>
        <element name="Location_Code">
         <complexType>
          <attribute name="Country_Code" type="unsignedByte"/>
          <attribute name="State_Code" type="unsignedByte"/>
          <attribute name="State_Subdivision_Code" type="unsignedByte"/>
          <attribute name="County_Code" type="unsignedByte"/>
         </complexType>
        </element>
        <element name="Exception_Channel" minOccurs="0" maxOccurs="unbounded">
         <complexType>
          <sequence>
           <element name="EAS_Stream" maxOccurs="unbounded">
            <complexType>
             <attribute name="Stream_Type" type="unsignedByte" use="required"/>
             <attribute name="Language" type="string"/>
             <attribute name="Target_Port_Num" type="unsignedInt" use="required"/>
            </complexType>
           </element>
          </sequence>
          <attribute name="Target_IP_Address" type="unsignedLong" use="required"/>
          <attribute name="Carrier_Frequency" type="unsignedLong"/>
          <attribute name="Transport_Stream_ID" type="unsignedShort" use="required"/>
          <attribute name="Ensemble_ID" type="unsignedByte" use="required"/>
          <attribute name="Source_ID" type="unsignedShort" use="required"/>
         </complexType>
        </element>
       </sequence>
       <attribute name="Alert_Priority" type="unsignedByte" use="required"/>
       <attribute name="Force_Tune" type="boolean" use="required"/>
       <attribute name="Force_Tune_Duration" type="duration"/>
      </complexType>
     </element>
    </sequence>
   </extension>
  </complexContent>
 </complexType>
</element>
```

FIG. 44

```
<element name="Schedule_Update">
  <complexType>
    <sequence>
      <element name="Reference" type="Reference"/>
      <element name="Schedule_Info">
        <complexType>
          <sequence>
            <element name="Update_Boundary" minOccurs="0">
              <complexType>
                <sequence>
                  <element name="Previous_Schedule" type="Reference" minOccurs="0"
                    maxOccurs="unbounded"/>
                  <element name="Following_Schedule" type="Reference" minOccurs="0"
                    maxOccurs="unbounded"/>
                </sequence>
              </complexType>
            </element>
            <element name="Current_Start_Time" type="dateTime" minOccurs="0"/>
            <element name="Current_End_Time" type="dateTime" minOccurs="0"/>
            <element name="Updated_Start_Time" type="dateTime"/>
            <element name="Updated_End_Time" type="dateTime"/>
          </sequence>
        </complexType>
      </element>
    </sequence>
    <attribute name="Notification_Msg_ID" type="unsignedShort" use="required"/>
    <attribute name="Notification_Msg_Version" type="unsignedShort" use="required"/>
    <attribute name="Emergency" type="boolean" use="required"/>
    <attribute name="ValidFrom" type="dateTime"/>
    <attribute name="ValidTo" type="dateTime"/>
    <attribute name="Fragment_Number" type="unsignedShort"/>
    <attribute name="Last_Fragment_Number" type="unsignedShort"/>
  </complexType>
</element>

<complexType name="Reference">
  <attribute name="Event_ID" type="unsignedShort" use="required"/>
  <attribute name="Service_Reference" type="anyURI" use="required"/>
  <attribute name="Source_ID" type="unsignedShort" use="required"/>
  <attribute name="Content_Reference" type="anyURI"/
</complexType>
```

DIGITAL BROADCASTING SYSTEM AND DATA PROCESSING METHOD

This application claims the benefit of U.S. Provisional Application No. 60/974,084, filed on Sep. 21, 2007, which is hereby incorporated by reference. Also, this application claims the benefit of U.S. Provisional Application No. 60/977,379, filed on Oct. 4, 2007, which is hereby incorporated by reference. This application also claims the benefit of U.S. Provisional Application No. 61/042,243, filed on Apr. 3, 2008, which is hereby incorporated by reference. This application also claims the benefit of U.S. Provisional Application No. 61/044,504, filed on Apr. 13, 2008, which is hereby incorporated by reference. This application also claims the benefit of U.S. Provisional Application No. 61/076,686, filed on Jun. 29, 2008, which is hereby incorporated by reference. This application also claims the priority benefit of Korean Application No. 10-2008-0091840, filed on Sep. 18, 2008, which is hereby incorporated by reference.

BACKGROUND OF THE INVENTION

1. Field of the Invention

The present invention relates to a digital broadcasting system, and more particularly, to a digital broadcasting system and a data processing method.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a data processing method that substantially obviate one or more problems due to limitations and disadvantages of the related art.

An object of the present invention is to provide a digital broadcasting system and a data processing method that are highly resistant to channel changes and noise.

Another object of the present invention is to provide a digital broadcasting system and method of processing data therein, by which a notification message can be transmitted/received via a notification channel.

Another object of the present invention is to provide a receiving system and method of processing data therein, by which an emergency can be notified to a user in the course of a mobile service in a manner of receiving and processing EAS (emergency alert system) data according to an emergency via a notification channel.

A further object of the present invention is to provide a receiving system and method of processing data therein, by which guide information of the receiving system can be efficiently updated in a manner of receiving and processing ESG update information according to a broadcast schedule change via a notification channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a receiving system according to the present invention includes a baseband processor unit, a management processor, and a presentation processor unit. The baseband processor unit receives a broadcast signal including mobile service data and main service data. The mobile service data can configure an RS frame and wherein the RS frame includes at least one of the mobile service data and a notification message and at least one of a first signaling information describing signaling information of a virtual channel for transmitting the mobile service data and a second signaling information describing signaling information on a notification channel for transmitting the notification message. The management processor unit accesses the notification message by parsing the second signaling information from the RS frame. The management processor unit processes the accessed notification message and stores the processed notification message in a storage device. The presentation processor unit outputs the processes notification message to an output device.

Data of the RS frame can configure at least one or more data groups, each of the at least one or more data groups includes the data of the RS frame and a plurality of known data sequences, and transmission parameter channel (TPC) data and fast information channel (FIC) data are received by being included between a first known data sequence and a second known data sequence among a plurality of the known data sequences.

The TPC data includes information for identifying an update of the FIC data and the FIC data includes notification channel information on the notification channel for transmitting the notification message and ensemble identifying information on an ensemble including the notification channel.

The FIC data further includes information for identifying whether the notification message received on the corresponding notification channel has an emergency property.

The notification channel is activated if a notification event occurs. The notification channel is deactivated if the notification event ends. And, the FIC data includes information for identifying whether the notification channel is activated.

The second signaling information is received by being included in the RS frame of an ensemble having the notification channel exist therein and the second signaling information includes access information of the notification channel and the notification message received on the notification channel.

The notification message includes information for identifying the corresponding notification message, version information of the corresponding notification message, valid period information of the corresponding notification message and notification contents.

The notification message further includes identification information for identifying whether the corresponding notification message has an emergency attribute.

If the corresponding notification message is fragmented, the notification message further includes information for identifying an order of a corresponding fragment or an order of a last fragment.

If the accessed notification message includes EAS data, the management processor unit processes the EAS data according to priority information of the EAS data and then outputs the processed EAS data to the presentation processor unit.

If the accessed notification message includes schedule update information, the management processor unit processes the schedule update information and then updates schedule relevant guide information stored in the storage device.

In another aspect of the present invention, a method of processing data in a receiving system includes the steps of receiving a broadcast signal including mobile service data and main service data, wherein the mobile service data can configure an RS frame and wherein the RS frame includes at least one of the mobile service data and a notification message and at least one of a first signaling information describing signaling information of a virtual channel for transmitting the mobile service data and a second signaling information describing signaling information on a notification channel for transmitting the notification message, accessing the notification message by parsing the second signaling information from the RS frame and processing the accessed notification message, storing the processed notification message in a storage device, and outputting the processes notification message to an output device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 illustrates an exemplary bit stream syntax structure with respect to an FIC segment according to an embodiment of the present invention;

FIG. 16 illustrates an exemplary bit stream syntax structure with respect to a payload of an FIC segment according to the present invention, when an FIC type field value is equal to '0';

FIG. 17 illustrates an exemplary bit stream syntax structure of a service map table according to the present invention;

FIG. 18 illustrates an exemplary bit stream syntax structure of an MH audio descriptor according to the present invention;

FIG. 19 illustrates an exemplary bit stream syntax structure of an MH RTP payload type descriptor according to the present invention;

FIG. 20 illustrates an exemplary bit stream syntax structure of an MH current event descriptor according to the present invention;

FIG. 21 illustrates an exemplary bit stream syntax structure of an MH next event descriptor according to the present invention;

FIG. 22 illustrates an exemplary bit stream syntax structure of an MH system time descriptor according to the present invention;

FIG. 26 is a diagram of a syntax structure for FIC segment according to another embodiment of the present invention;

FIG. 27 is a diagram of one embodiment for the value allocation and meaning of Channel_Type field of the FIC segment shown in FIG. 26;

FIG. 28 is a diagram of one embodiment for the value allocation and meaning of Channel_Activity field of the FIC segment shown in FIG. 26;

FIG. 31 is a diagram of one embodiment for the value allocation and meaning of type_indicator field included in the MH header shown in FIG. 30;

FIG. 33 is a diagram for a syntax structure of SMT according to another embodiment of the present invention;

FIG. 34 is a diagram of a syntax structure of NAT according to one embodiment of the present invention;

FIG. 35 is a diagram of XML (extensible markup language) data structure for an example of a notification message (Notification_Message) according to the present invention;

FIG. 36 is a diagram of the notification message (Notification_Message) shown in FIG. 3 in XML schema;

FIG. 40 is a diagram of the notification message represented in XML schema form;

FIG. 44 is a diagram of the notification message shown in FIG. 43 represented in an XML schema form.

DETAILED DESCRIPTION OF THE INVENTION

Figure 1:
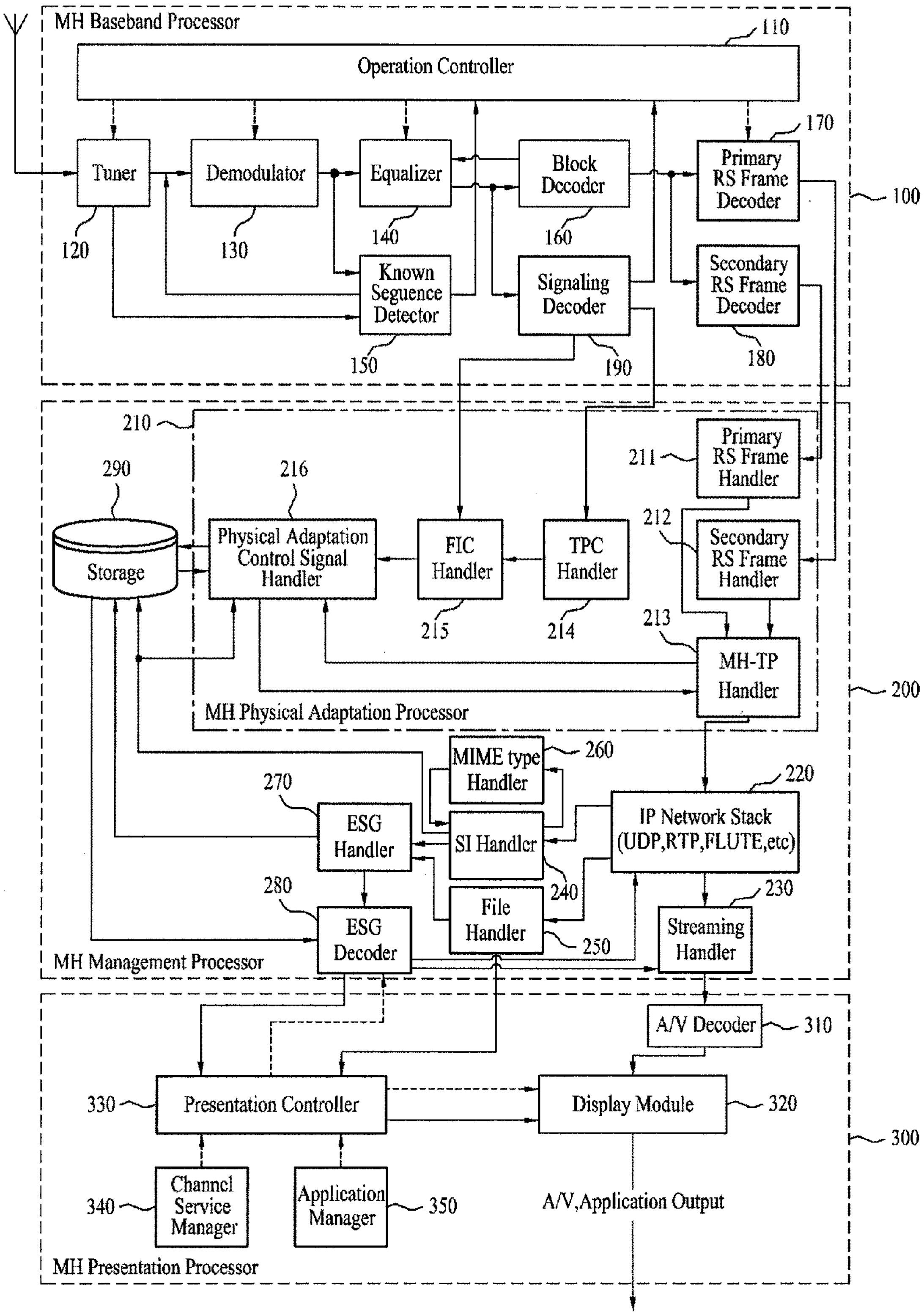
FIG. 1 illustrates a block diagram showing a general structure of a digital broadcasting receiving system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, among the terms used in the present invention, "MH" corresponds to the initials of "mobile" and "handheld" and represents the opposite concept of a fixed-type system. Furthermore, the MH service data may include at least one of mobile service data and handheld service data, and will also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Furthermore, the digital broadcast transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

Receiving System

FIG. 1 illustrates a block diagram showing a general structure of a digital broadcasting receiving system according to an embodiment of the present invention. The digital broadcast receiving system according to the present invention includes a baseband processor 100, a management processor 200, and a presentation processor 300. The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190. The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 140. The passband digital IF signal being outputted from the tuner 120 may only include main service data, or only include mobile service data, or include both main service data and mobile service data.

The demodulator 130 performs self-gain control, carrier recovery, and timing recovery processes on the passband digital IF signal inputted from the tuner 120, thereby modifying the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier recovery, thereby enhancing the demodulating performance. The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feedback on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data. The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160.

Herein, the primary RS frame decoder 170 receives only the mobile service data and not the main service data. The primary RS frame decoder 170 performs inverse processes of an RS frame encoder (not shown) included in the digital broadcast transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the digital broadcast transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290. The MH physical adaptation processor 210 includes a primary RS frame handler 211, a secondary RS frame handler 212, an MH transport packet (TP) handler 213, a TPC handler 214, an FIC handler 215, and a physical adpatation control signal handler 216. The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data are transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number. Herein, the MH ensemble ID indicates an identification number of each MH ensemble carried in the corresponding channel. The MH sub-frame number signifies a number identifying the MH sub-frame number in an MH frame, wherein each MH group associated with the corresponding MH ensemble is transmitted. The TNoG represents the total number of MH groups including all of the MH groups belonging to all MH parades included in an MH sub-frame. The RS frame continuity counter indicates a number that serves as a continuity counter of the RS frames carrying the corresponding MH ensemble. Herein, the value of the RS frame continuity counter shall be incremented by 1 modulo 16 for each successive RS frame. N represents the column size of an RS frame belonging to the corresponding MH ensemble. Herein, the value of N determines the size of each MH TP. Finally, the FIC version number signifies the version number of an FIC body carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data. The FIC handler 215 processes the FIC data by associating the FIC data received from the baseband processor 100 with the TPC data. The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213. The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213. The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220. When the inputted data associated with SI correspond to MIME-type data, the inputted data are outputted to the MIME-type handler 260. The MIME-type handler 260 receives the MIME-type SI data outputted from the SI handler 240 and processes the received MIME-type SI data. The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280. The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user. The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen. The presentation controller 330 corresponds to a controller managing modules that output data received by the receiving system to the user. The channel service manager 340 manages an interface with the user, which enables the user to use channel-based broadcast services, such as channel map management, channel service connection, and so on. The application manager 350 manages an interface with a user using ESG display or other application services that do not correspond to channel-based services.

Data Format Structure

Meanwhile, the data structure used in the mobile broadcasting technology according to the embodiment of the present invention may include a data group structure and an RS frame structure, which will now be described in detail.

Figure 2:
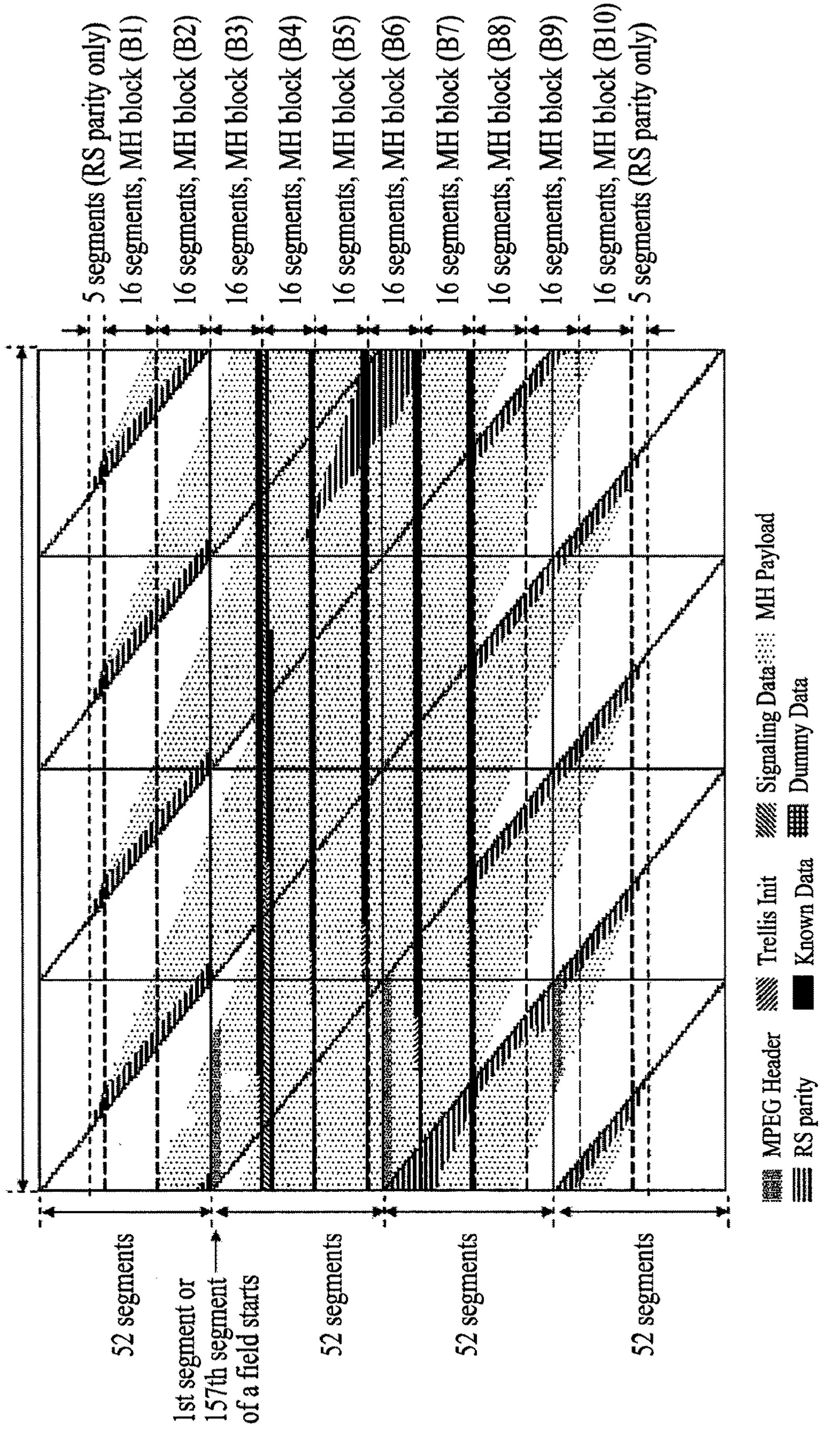
FIG. 2 illustrates an exemplary structure of a data group according to the present invention.

FIG. 2 illustrates an exemplary structure of a data group according to the present invention. FIG. 2 shows an example of dividing a data group according to the data structure of the present invention into 10 MH blocks (i.e., MH block 1 (B1) to MH block 10 (B10)). In this example, each MH block has the length of 16 segments. Referring to FIG. 2, only the RS parity data are allocated to portions of the first 5 segments of the MH block 1 (B1) and the last 5 segments of the MH block 10 (B10). The RS parity data are excluded in regions A to D of the data group. More specifically, when it is assumed that one data group is divided into regions A, B, C, and D, each MH block may be included in any one of region A to region D depending upon the characteristic of each MH block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, the strongest equalizing performance may be yielded (or obtained) from one of region A to region D.

In the example of the data group shown in FIG. 2, MH block 3 (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MH block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MH block, the receiving system is capable of performing equalization by using the channel information that can be obtained from the known data. Therefore, a stronger equalizing performance as compared to region C/D may be yielded (or obtained).

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)". Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10) Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ MH block (B4) to a portion of the $2^{nd}$ segment. According to an embodiment of the present invention, the signaling information area for inserting signaling information may start from the $1^{st}$ segment of the $4^{th}$ MH block (B4) to a portion of the $2^{nd}$ segment. More specifically, 276(=207+69) bytes of the $4^{th}$ MH block (B4) in each data group are assigned as the signaling information area. In other words, the signaling information area consists of 207 bytes of the $1^{st}$ segment and the first 69 bytes of the $2^{nd}$ segment of the $4^{th}$ MH block (B4). The $1^{st}$ segment of the $4^{th}$ MH block (B4) corresponds to the $17^{th}$ or $173^{rd}$ segment of a VSB field.

Herein, the signaling information may be identified by two different types of signaling channels: a transmission parameter channel (TPC) and a fast information channel (FIC). Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s).

For example, when the data group includes 6 known data sequences, as shown in FIG. 2, the signaling information area is located between the first known data sequence and the second known data sequence. More specifically, the first known data sequence is inserted in the last 2 segments of the $3^{rd}$ MH block (B3), and the second known data sequence in inserted in the $2^{nd}$ and $3^{rd}$ segments of the $4^{th}$ MH block (B4). Furthermore, the $3^{rd}$ to $6^{th}$ known data sequences are respectively inserted in the last 2 segments of each of the $4^{th}$, $5^{th}$, $6^{th}$, and $7^{th}$ MH blocks (B4, B5, B6, and B7). The $1^{st}$ and $3^{rd}$ to $6^{th}$ known data sequences are spaced apart by 16 segments.

Figure 3:
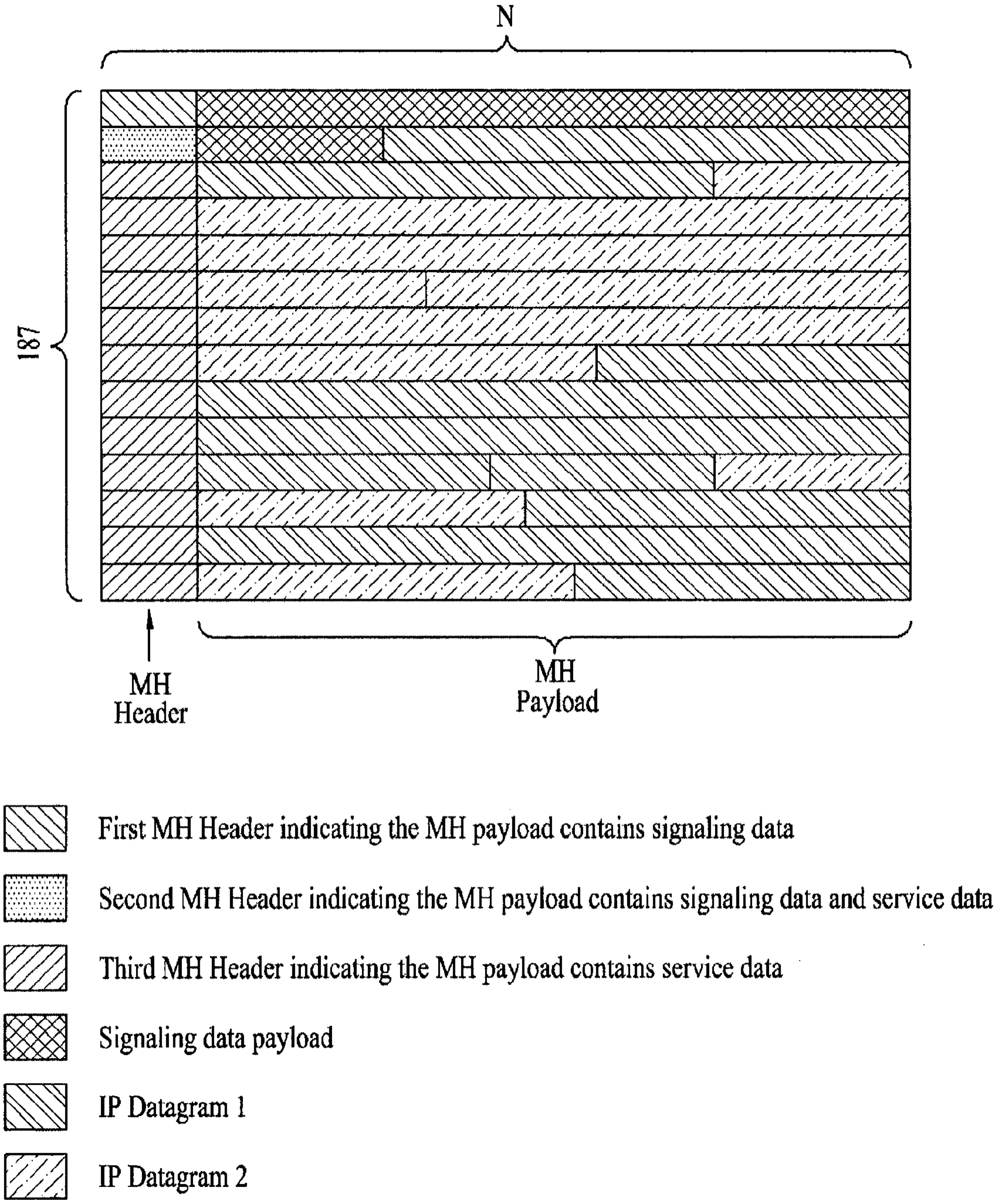
FIG. 3 illustrates an RS frame according to an embodiment of the present invention.

FIG. 3 illustrates an RS frame according to an embodiment of the present invention. The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes IP streams of each service or ESG, and SMT section data may exist in all RS frames. The RS frame according to the embodiment of the present invention consists of at least one MH transport packet (TP). Herein, the MH TP includes an MH header and an MH payload.

The MH payload may include mobile service data as well as signaling data. More specifically, an MH payload may include only mobile service data, or may include only signaling data, or may include both mobile service data and signaling data. According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data. In the example shown in FIG. 3, the RS frame is assigned with IP datagrams (IP datagram 1 and IP datagram 2) for two service types.

Data Transmission Structure

Figure 4:
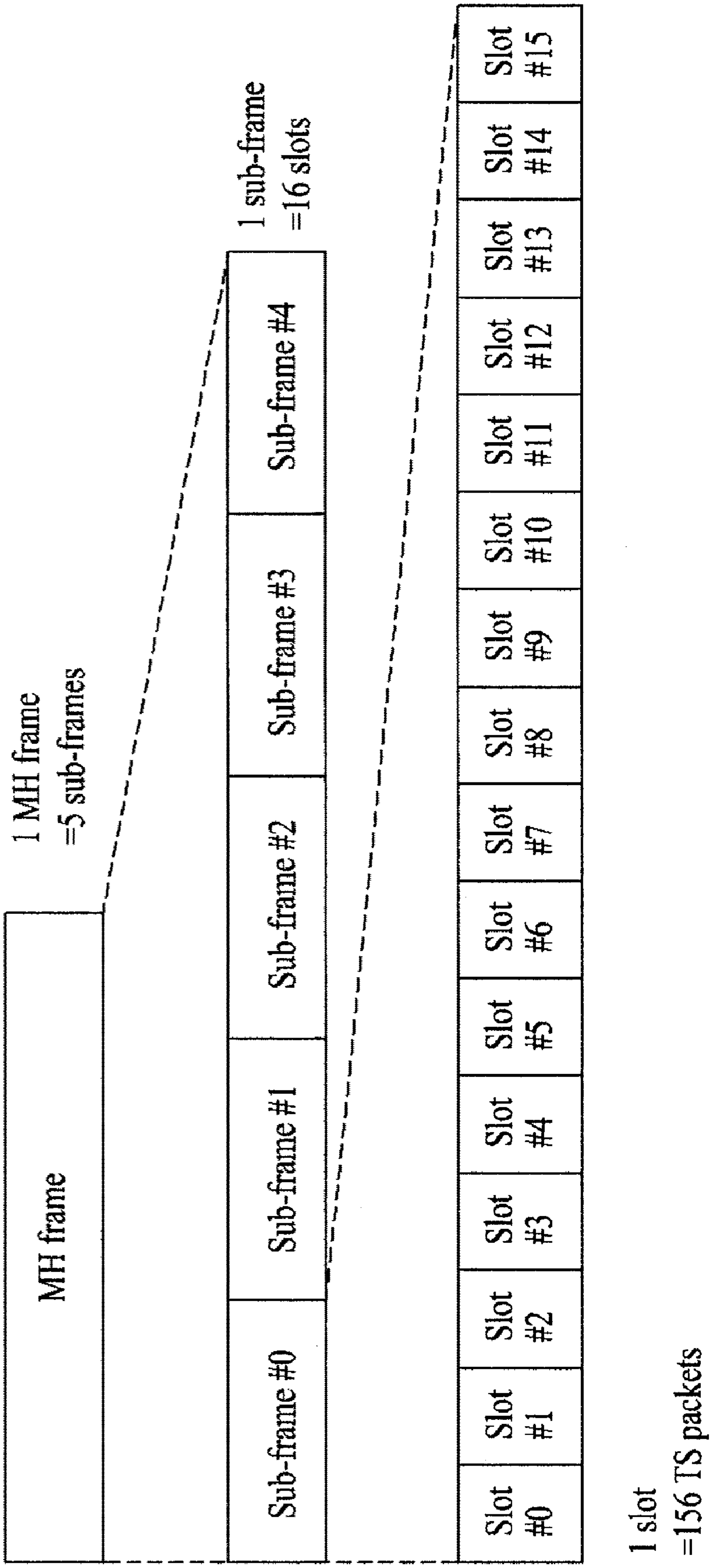
FIG. 4 illustrates an example of an MH frame structure for transmitting and receiving mobile service data according to the present invention.

FIG. 4 illustrates a structure of a MH frame for transmitting and receiving mobile service data according to the present invention. In the example shown in FIG. 4, one MH frame consists of 5 sub-frames, wherein each sub-frame includes 16 slots. In this case, the MH frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 5:
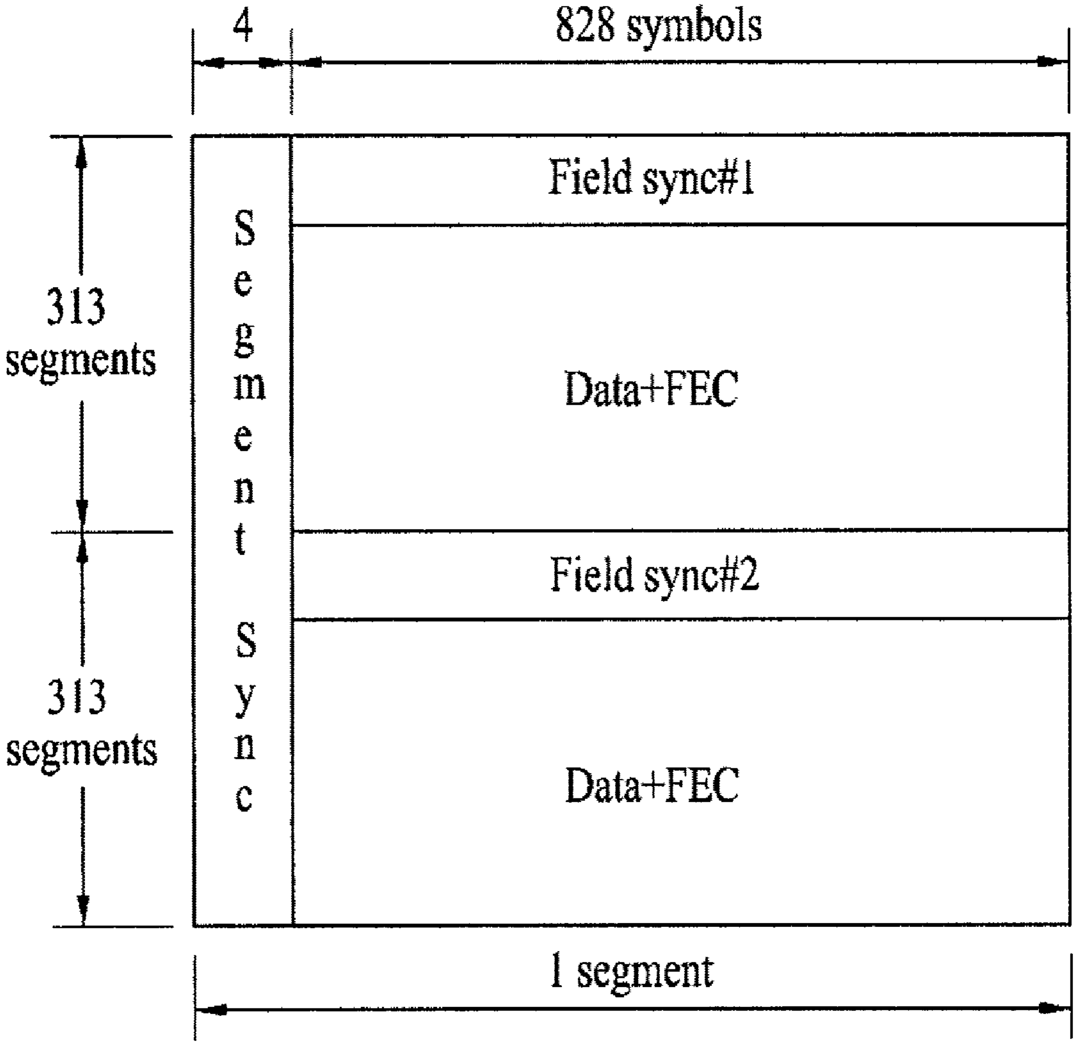
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data. Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets. Meanwhile, when the slots are assigned to a VSB frame, an off-set exists for each assigned position.

Figure 6:
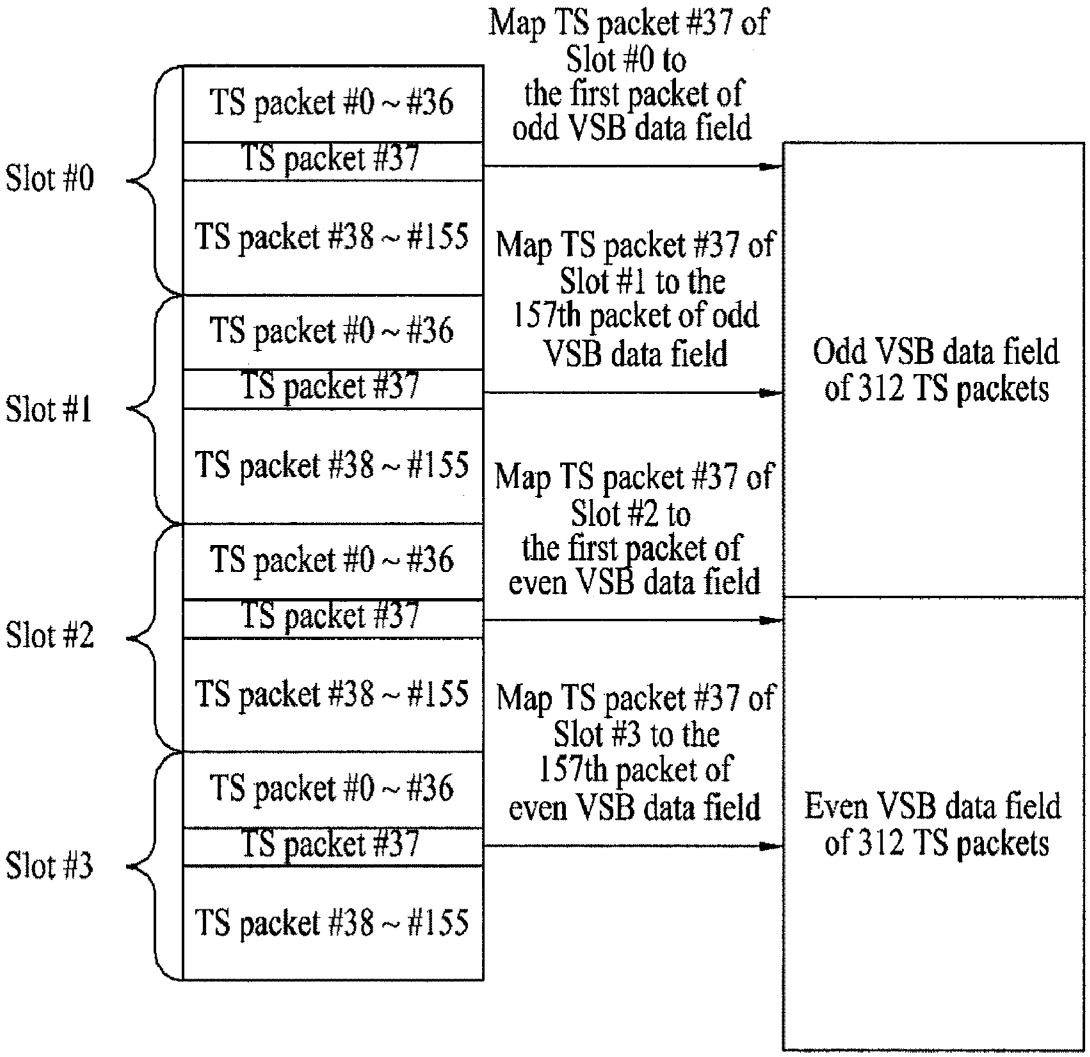
FIG. 6 illustrates a example of mapping positions of the first 4 slots of a sub-frame in a spatial area with respect to a VSB frame.
Figure 7:
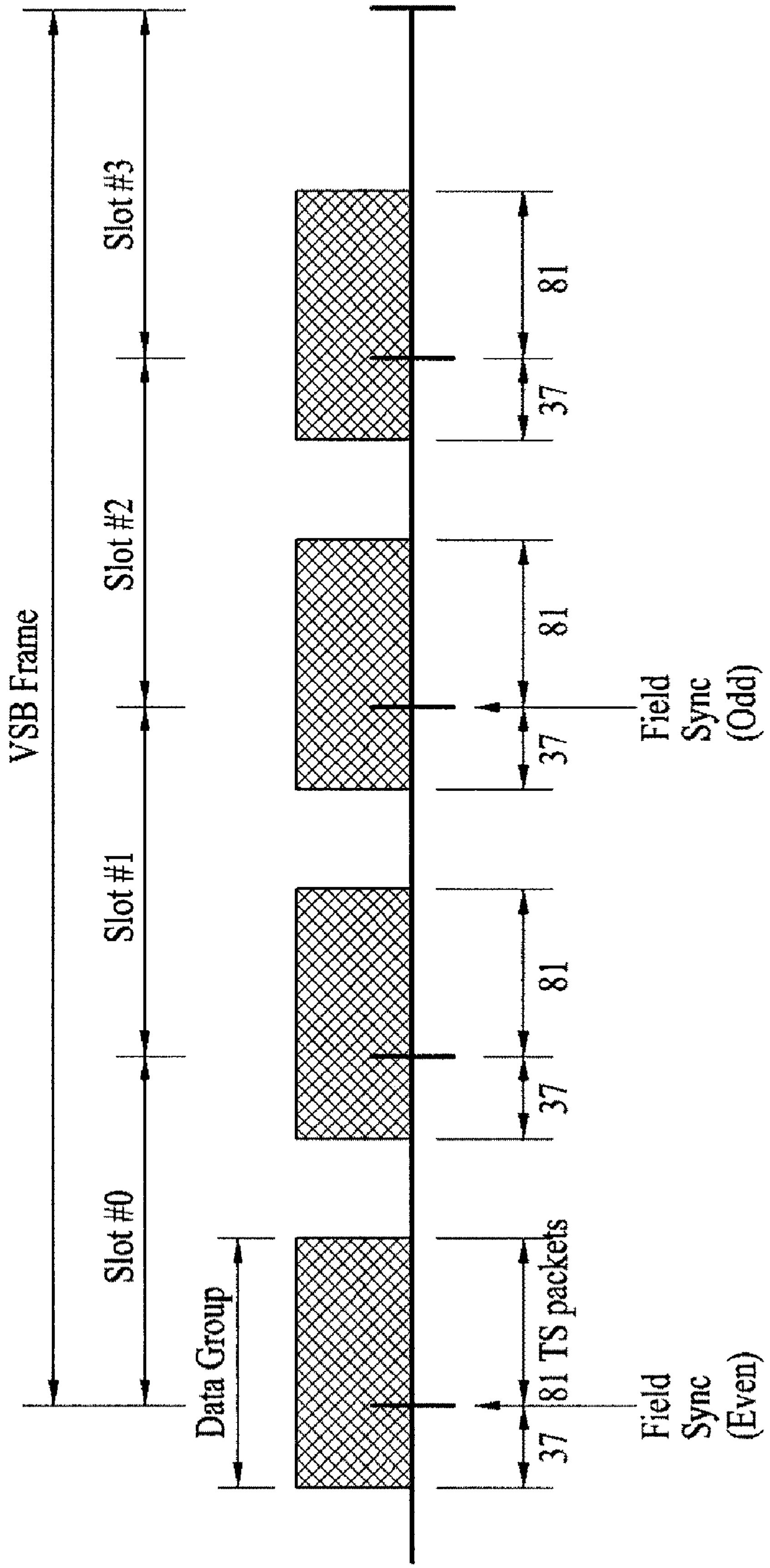
FIG. 7 illustrates a example of mapping positions of the first 4 slots of a sub-frame in a chronological (or time) area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area. Referring to FIG. 6 and FIG. 7, a $38^{th}$ data packet (TS packet #37) of a $1^{st}$ slot (Slot #0) is mapped to the $1^{st}$ data packet of an odd VSB field. A $38^{th}$ data packet (TS packet #37) of a $2^{nd}$ slot (Slot #1) is mapped to the $157^{th}$ data packet of an odd VSB field. Also, a $38^{th}$ data packet (TS packet #37) of a $3^{rd}$ slot (Slot #2) is mapped to the $1^{st}$ data packet of an even VSB field. And, a $38^{th}$ data packet (TS packet #37) of a $4^{th}$ slot (Slot #3) is mapped to the $157^{th}$ data packet of an even VSB field. Similarly, the remaining 12 slots within the corresponding sub-frame are mapped in the subsequent VSB frames using the same method.

Figure 8:
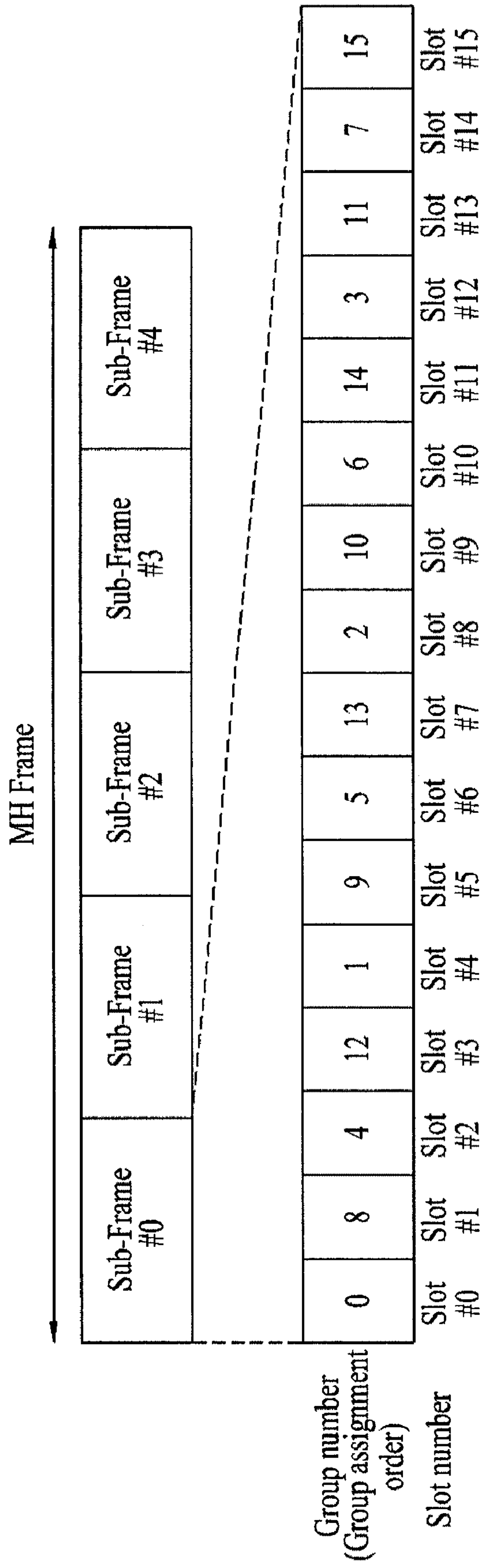
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MH frame, the total number of data groups being assigned to an MH frame is equal to a multiple of '5'. According to the embodiment of the present invention, a plurality of consecutive data groups is assigned to be spaced as far apart from one another as possible within the MH frame. Thus, the system can be capable of responding promptly and effectively to any burst error that may occur within a sub-frame.

For example, when it is assumed that 3 data groups are assigned to a sub-frame, the data groups are assigned to a $1^{st}$ slot (Slot #0), a $5^{th}$ slot (Slot #4), and a $9^{th}$ slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15.

Equation 1 below shows the above-described rule (or pattern) for assigning data groups in a sub-frame.

$$j=(4i+0)\bmod 16 \qquad \text{Equation 1}$$

0=0 if i<4,

0=2 else if i<8,

Herein,

0=1 else if i<12,

0=3 else.

Herein, j indicates the slot number within a sub-frame. The value of j may range from 0 to 15 (i.e., $0 \leqq j \leqq 15$). Also, variable i indicates the data group number. The value of i may range from 0 to 15 (i.e., $0 \leqq i \leqq 15$).

In the present invention, a collection of data groups included in a MH frame will be referred to as a "parade". Based upon the RS frame mode, the parade transmits data of at least one specific RS frame. The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the above-described TPC data. Table 1 below shows an example of the RS frame mode.

TABLE 1

| RS frame mode (2 bits) | Description |
|---|---|
| 00 | There is only one primary RS frame for all group regions |
| 01 | There are two separate RS frames.<br>Primary RS frame for group regions A and B<br>Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame. Furthermore, the method of assigning parades may be identically applied to all MH frames or differently applied to each MH frame. According to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
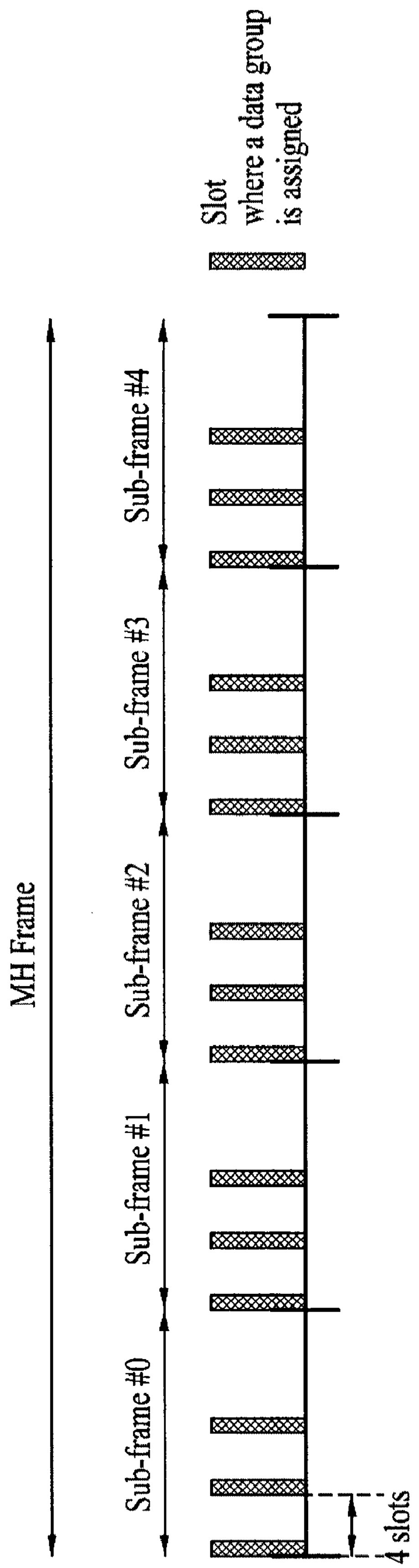
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a plurality of data groups included in a single parade, wherein the number of data groups included in a sub-frame is equal to '3', being allocated to an MH frame. Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% (=24/(187+24)×100) of the total code word length. Meanwhile, when one sub-frame includes 3 data groups, and when the data groups included in the parade are assigned, as shown in FIG. 9, a total of 15 data groups form an RS frame. Accordingly, even when an error occurs in an entire data group due to a burst noise within a channel, the percentile is merely 6.67% (=1/15×100). Therefore, the receiving system may correct all errors by performing an erasure RS decoding process. More specifically, when the erasure RS decoding is performed, a number of channel errors corresponding to the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame. Basically, the method of assigning data groups corresponding to multiple parades is very similar to the method of assigning data groups corresponding to a single parade. In other words, data groups included in other parades that are to be assigned to an MH frame are also respectively assigned according to a cycle period of 4 slots. At this point, data groups of a different parade may be sequentially assigned to the respective slots in a circular method. Herein, the data groups are assigned to slots starting from the ones to which data groups of the previous parade have not yet been assigned. For example, when it is assumed that data groups corresponding to a parade are assigned as shown in FIG. 9, data groups corresponding to the next parade may be assigned to a sub-frame starting either from the $12^{th}$ slot of a sub-frame. However, this is merely exemplary. In another example, the data groups of the next parade may also be sequentially assigned to a different slot within a sub-frame at a cycle period of 4 slots starting from the $3^{rd}$ slot.

Figure 10:
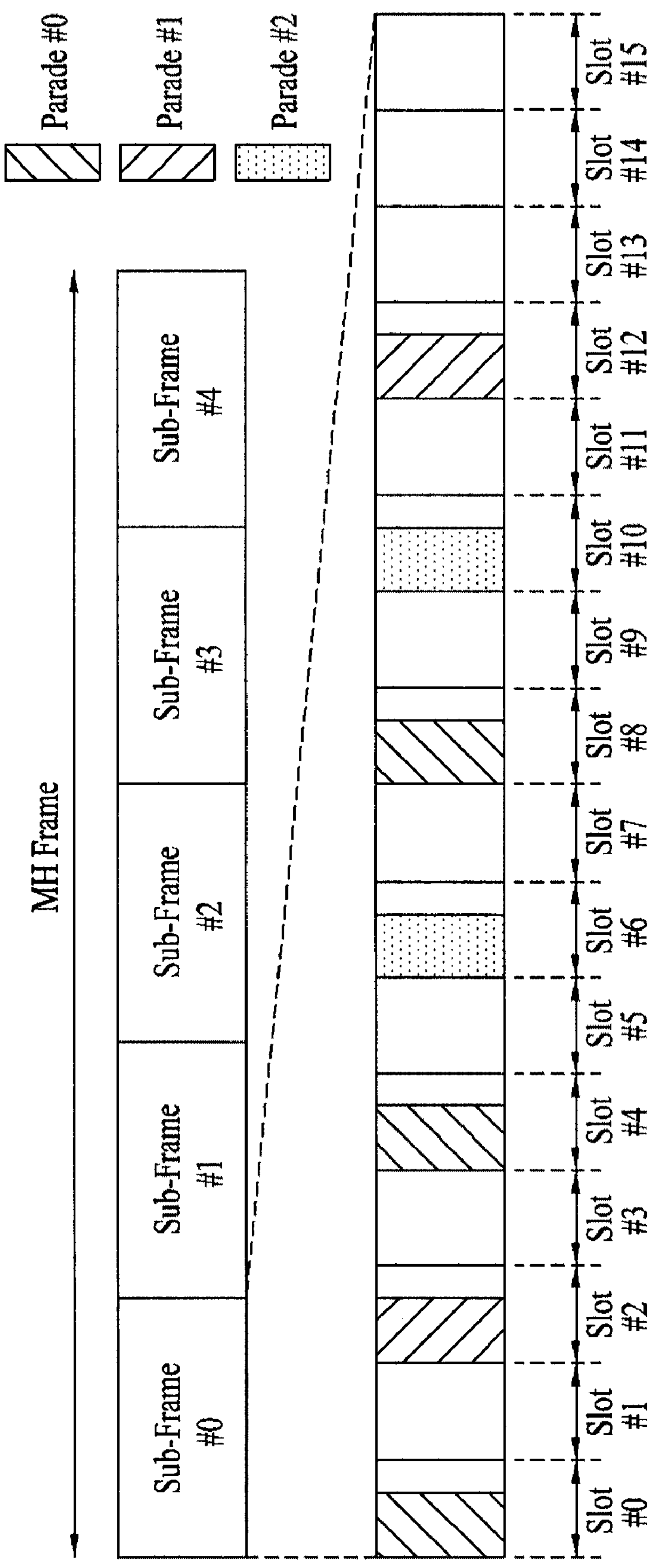
FIG. 10 illustrates an example of 3 parades being assigned to an MH frame according to the present invention.

FIG. 10 illustrates an example of transmitting 3 parades (Parade #0, Parade #1, and Parade #2) to an MH frame. More specifically, FIG. 10 illustrates an example of transmitting parades included in one of 5 sub-frames, wherein the 5 sub-frames configure one MH frame. When the $1^{st}$ parade (Parade #0) includes 3 data groups for each sub-frame, the positions of each data groups within the sub-frames may be obtained by substituting values '0' to '2' for i in Equation 1. More specifically, the data groups of the $1^{st}$ parade (Parade #0) are sequentially assigned to the $1^{st}$, $5^{th}$, and $9^{th}$ slots (Slot #0, Slot #4, and Slot #8) within the sub-frame. Also, when the $2^{nd}$ parade includes 2 data groups for each sub-frame, the positions of each data groups within the sub-frames may be obtained by substituting values '3' and '4' for in Equation 1. More specifically, the data groups of the $2^{nd}$ parade (Parade #1) are sequentially assigned to the $2^{nd}$ and $12^{th}$ slots (Slot #3 and Slot #11) within the sub-frame. Finally, when the $3^{rd}$ parade includes 2 data groups for each sub-frame, the positions of each data groups within the sub-frames may be obtained by substituting values '5' and '6' for in Equation 1. More specifically, the data groups of the $3^{rd}$ parade (Parade #2) are sequentially assigned to the $7^{th}$ and $11^{th}$ slots (Slot #6 and Slot #10) within the sub-frame.

As described above, data groups of multiple parades may be assigned to a single MH frame, and, in each sub-frame, the data groups are serially allocated to a group space having 4 slots from left to right. Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5' ranging from '5' to '40'.

Figure 11:
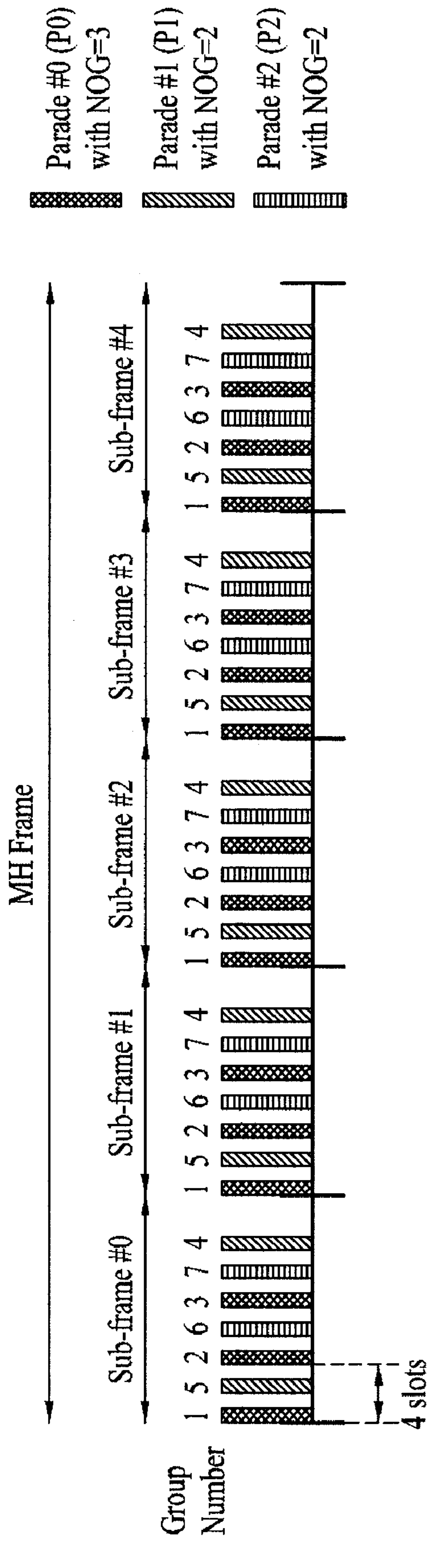
FIG. 11 illustrates an example of the process of assigning 3 parades shown in FIG. 10 being expanded to 5 sub-frames within an MH frame.
Figure 12:
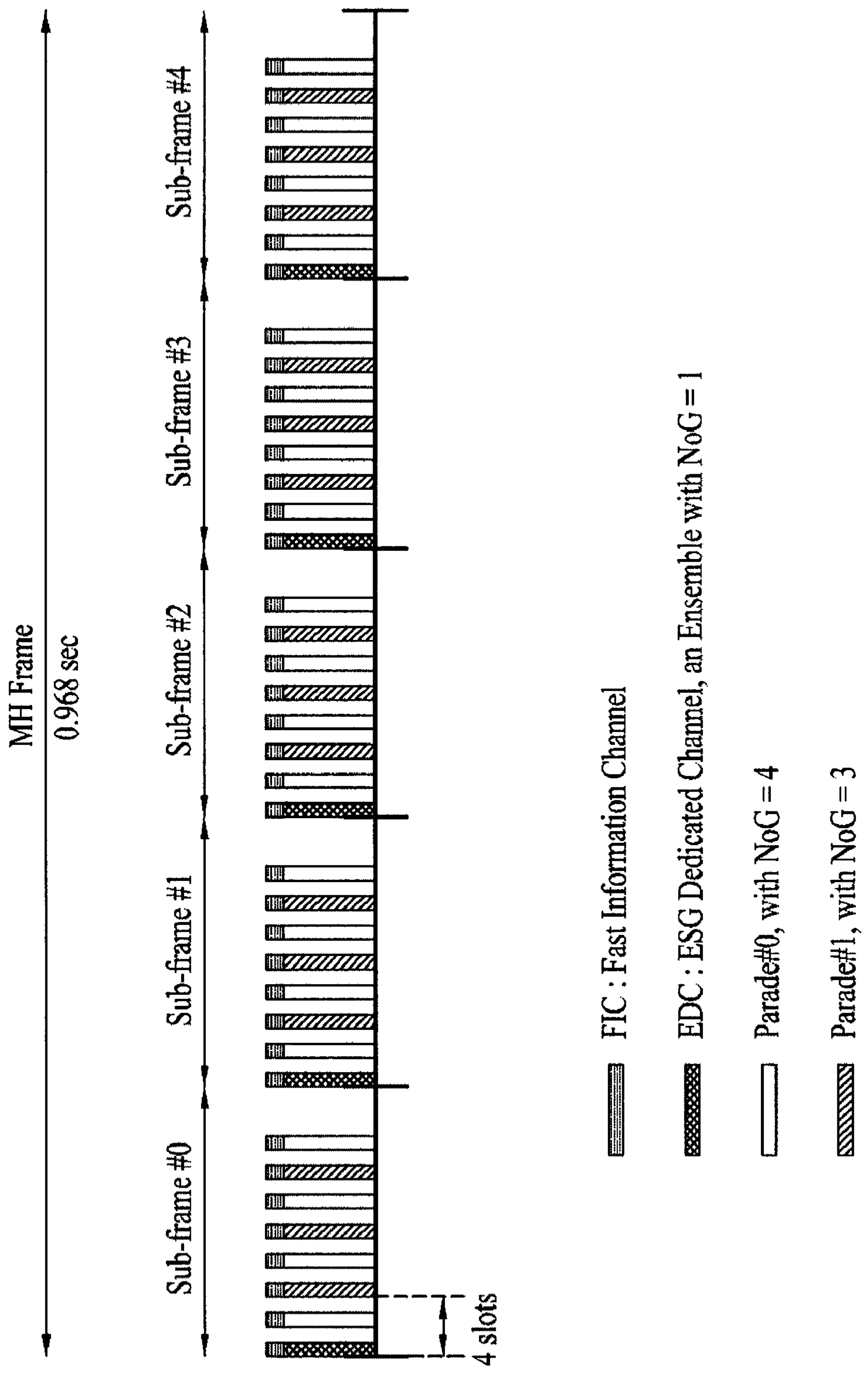
FIG. 12 illustrates a data transmission structure according to an embodiment of the present invention, wherein signaling data are included in a data group so as to be transmitted.

FIG. 11 illustrates an example of expanding the assignment process of 3 parades, shown in FIG. 10, to 5 sub-frames within an MH frame. FIG. 12 illustrates a data transmission structure according to an embodiment of the present invention, wherein signaling data are included in a data group so as to be transmitted. As described above, an MH frame is divided into 5 sub-frames. Data groups corresponding to a plurality of parades co-exist in each sub-frame. Herein, the data groups corresponding to each parade are grouped by MH frame units, thereby configuring a single parade.

The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each segment is interleaved by MH sub-frame units, thereby configuring an FIC body, which corresponds to a completed FIC transmission structure. However, whenever required, each segment may be interleaved by MH frame units and not by MH sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames. As shown in FIG. 12, the FIC segment corresponding to each data group described service information of an MH ensemble to which the corresponding data group belongs. When FIC segments within a sub-frame are grouped and deinterleved, all service information of a physical channel through which the corresponding FICs are transmitted may be obtained. Therefore, the receiving system may be able to acquire the channel information of the corresponding physical channel, after being processed with physical channel tuning, during a sub-frame period. Furthermore, FIG. 12 illustrates a structure further including a separate EDC parade apart from the service parade and wherein electronic service guide (ESG) data are transmitted in the $1^{st}$ slot of each sub-frame.

Hierarchical Signaling Structure

Figure 13:
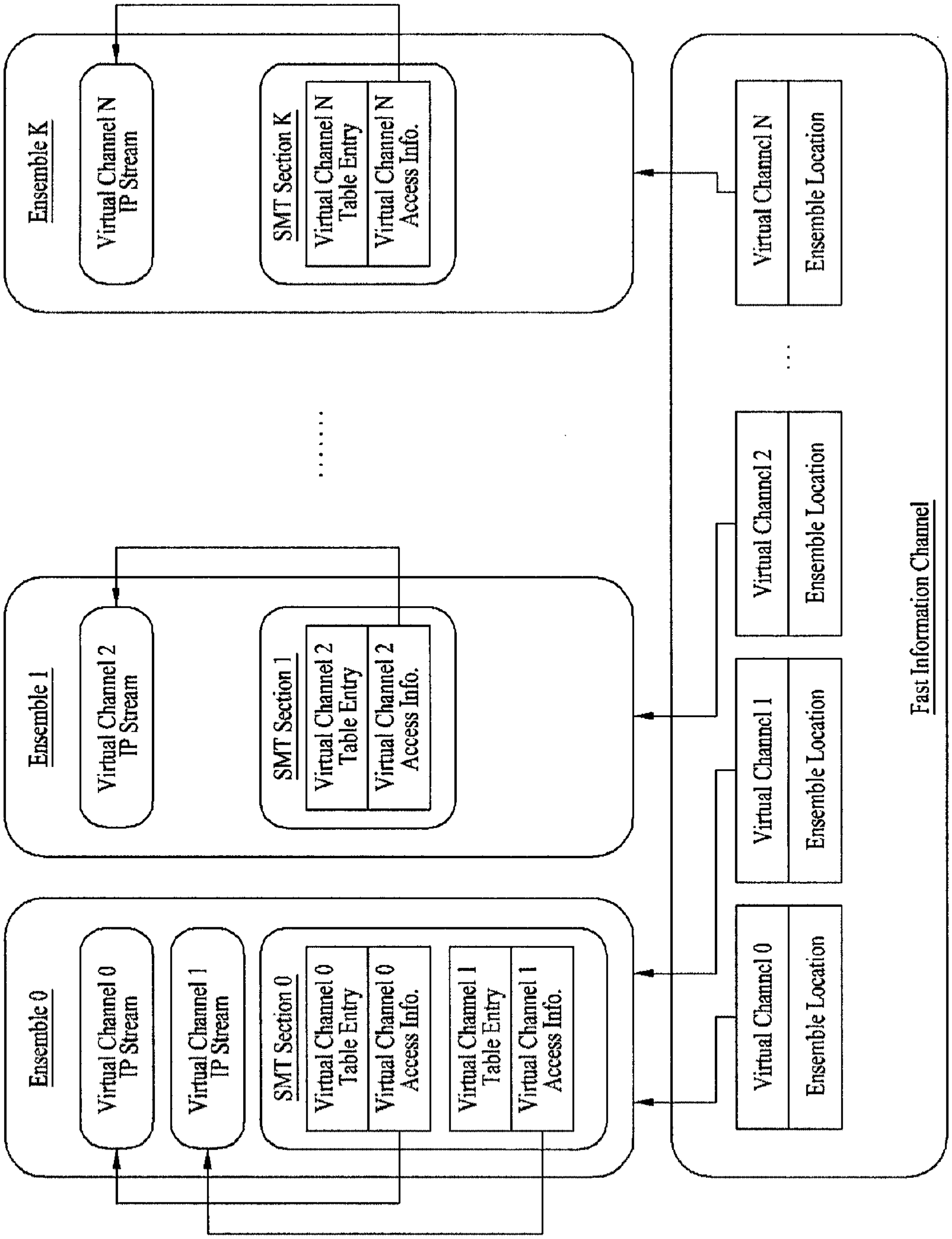
FIG. 13 illustrates a hierarchical signaling structure according to an embodiment of the present invention.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure. Hereinafter, a detailed description on how the receiving system accesses a virtual channel via FIC and SMT will now be given with reference to FIG. 13. The FIC body defined in an MH transport (M1) identifies the physical location of each the data stream for each virtual channel and provides very high level descriptions of each virtual channel. Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, . . . , Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on). The FIC body payload includes information on MH ensembles (e.g., ensemble_id field, and referred to as "ensemble location" in FIG. 13) and information on a virtual channel associated with the corresponding MH ensemble (e.g., when such information corresponds to a major_channel_num field and a minor_channel_num field, the information is expressed as Virtual Channel 0, Virtual Channel 1, Virtual Channel N in FIG. 13).

The application of the signaling structure in the receiving system will now be described in detail. When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Fast Information Channel (FIC)

Figure 14:
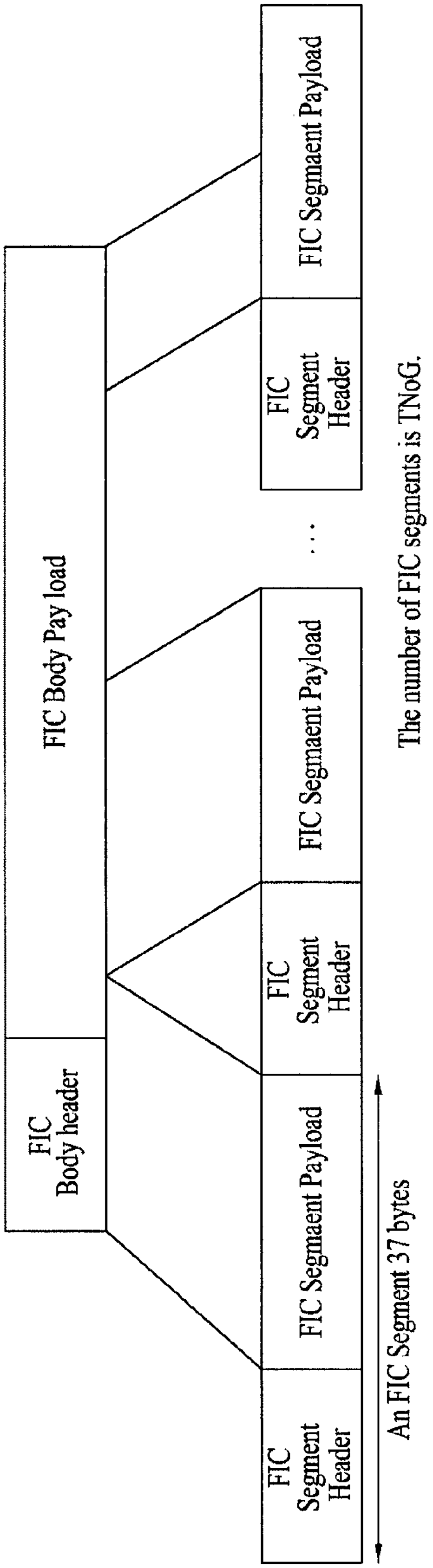
FIG. 14 illustrates an exemplary FIC body format according to an embodiment of the present invention.

The digital broadcast receiving system according to the present invention adopts the fast information channel (FIC) for a faster access to a service that is currently being broadcasted. More specifically, the FIC handler 215 of FIG. 1 parses the FIC body, which corresponds to an FIC transmission structure, and outputs the parsed result to the physical adaptation control signal handler 216. FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload, is segmented in units of 35 data bytes, which are then carried in at least one FIC segment within the FIC segment payload, so as to be transmitted. In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes. However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention. Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, an FIC_seg_number field, and an FIC_last_seg_number field. A detailed description of each field will now be given.

The FIC_type field is a 2-bit field indicating the type of the corresponding FIC. The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data. The FIC_seg_number field is a 4-bit field. Herein, when a single FIC body is divided into a plurality of FIC segments and transmitted, the FIC_seg_number field indicates the number of the corresponding FIC segment. Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'. According to the embodiment of the present invention, the payload of the FIC segment is divided into 3 different regions. A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 16-bit field. The current_next_indicator field acts as an indicator identifying whether the corresponding FIC data carry MH ensemble configuration information of an MH frame including the current FIC segment, or whether the corresponding FIC data carry MH ensemble configuration information of a next MH frame. The ESG_version field is a 5-bit field indicating ESG version information. Herein, by providing version information on the service guide providing channel of the corresponding ESG, the ESG_version field enables the receiving system to notify whether or not the corresponding ESG has been updated. Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, an SI_version field, and a num_channel field. More specifically, the ensemble_id field is an 8-bit field indicating identifiers of an MH ensemble through which MH services are transmitted. The MH services will be described in more detail in a later process. Herein, the ensemble_id field binds the MH services and the MH ensemble. The SI_version field is a 4-bit field indicating version information of SI data included in the corresponding ensemble, which is being transmitted within the RS frame. Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field. The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on. The channel_activity field is a 2-bit field indicating activity information of the corresponding virtual channel. More specifically, the channel_activity field may indicate whether the current virtual channel is providing the current service.

The CA_indicator field is a 1-bit field indicating whether or not a conditional access (CA) is applied to the current virtual channel. The stand_alone_service_indicator field is also a 1-bit field, which indicates whether the service of the corresponding virtual channel corresponds to a stand alone service. The major_channel_num field is an 8-bit field indicating a major channel number of the corresponding virtual channel. Finally, the minor_channel_num field is also an 8-bit field indicating a minor channel number of the corresponding virtual channel.

Service Table Map

FIG. 17 illustrates an exemplary bit stream syntax structure of a service map table (hereinafter referred to as "SMT") according to the present invention. According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area. Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213. When it is determined that the corresponding MH TP includes an SMT section based upon the header in each of the inputted MH TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is not encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290. The following corresponds to example of the fields that may be transmitted through the SMT.

The table_id field corresponds to an 8-bit unsigned integer number, which indicates the type of table section. The table_id field allows the corresponding table to be defined as the service map table (SMT). The ensemble_id field is an 8-bit unsigned integer field, which corresponds to an ID value associated to the corresponding MH ensemble.

Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB).

The num_channels field is an 8-bit field, which specifies the number of virtual channels in the corresponding SMT section. Meanwhile, the SMT according to the embodiment of the present invention provides information on a plurality of virtual channels using the 'for' loop statement. The major_channel_num field corresponds to an 8-bit field, which represents the major channel number associated with the corresponding virtual channel. Herein, the major_channel_num field may be assigned with a value ranging from '0x00' to '0xFF'. The minor_channel_num field corresponds to an 8-bit field, which represents the minor channel number associated with the corresponding virtual channel. Herein, the minor channel_num field may be assigned with a value ranging from '0x00' to '0xFF'.

The short_channel_name field indicates the short name of the virtual channel. The service_id field is a 16-bit unsigned integer number (or value), which identifies the virtual channel service. The service_type field is a 6-bit enumerated type field, which designates the type of service carried in the corresponding virtual channel as defined in Table 2 below.

TABLE 2

| | |
|---|---|
| 0x00 | [Reserved] |
| 0x01 | MH_digital_television field: the virtual channel carries television programming (audio, video and optional associated data) conforming to ATSC standards. |
| 0x02 | MH_audio field: the virtual channel carries audio programming (audio service and optional associated data) conforming to ATSC standards. |
| 0x03 | MH_data_only_service field: the virtual channel carries a data service conforming to ATSC standards, but no video or audio component. |
| 0x04 to 0xFF | [Reserved for future ATSC usage] |

The virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden. The num_components field is a 5-bit field, which specifies the number of IP stream components in the corresponding virtual channel. The IP_version_flag field corresponds to a 1-bit indicator. More specifically, when the value of the IP_version_flag field is set to '1', this indicates that a source_IP_address field, a virtual_channel_target_IP_address field, and a component_target_IP_address field are IPv6 addresses. Alternatively, when the value of the IP_version_flag field is set to '0', this indicates that the source_IP_address field, the virtual_channel_target_IP_address field, and the component_target_IP_address field are IPv4.

The source_IP_address_flag field is a 1-bit Boolean flag, which indicates, when set, that a source IP address of the corresponding virtual channel exist for a specific multicast source. The virtual_channel_target_IP_address_flag field is a 1-bit Boolean flag, which indicates, when set, that the corresponding IP stream component is delivered through IP datagrams with target IP addresses different from the virtual_channel_target_IP address. Therefore, when the flag is set, the receiving system (or receiver) uses the component_target_IP_address as the target_IP_address in order to access the corresponding IP stream component. Accordingly, the receiving system (or receiver) may ignore the virtual_channel_target_IP_address field included in the num_channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP address field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present). And, in order to enable the receiving system to access the IP stream component, the component_target_IP_address field should be used.

Meanwhile, the SMT according to the embodiment of the present invention uses a 'for' loop statement in order to provide information on a plurality of components. Herein, the RTP_payload_type field, which is assigned with 7 bits, identifies the encoding format of the component based upon Table 3 shown below. When the IP stream component is not encapsulated to RTP, the RTP_payload_type field shall be ignored (or deprecated). Table 3 below shows an example of an RTP payload type.

TABLE 3

| RTP_payload_type | Meaning |
|---|---|
| 35 | AVC video |
| 36 | MH audio |
| 37 to 72 | [Reserved for future ATSC use] |

The component_target_IP_address_flag field is a 1-bit Boolean flag, which indicates, when set, that the corresponding IP stream component is delivered through IP datagrams with target IP addresses different from the virtual_channel_target_IP_address. Furthermore, when the component_target_IP_address_flag is set, the receiving system (or receiver) uses the component_target_IP_address field as the target IP address for accessing the corresponding IP stream component. Accordingly, the receiving system (or receiver) will ignore the virtual_channel_target_IP_address field included in the num_channels loop. The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

The port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

The target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream. The component_level_descriptor( ) represents zero or more descriptors providing additional information on the corresponding IP stream component. The virtual_channel_level_descriptor( ) represents zero or more descriptors providing additional information for the corresponding virtual channel. The ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention. When at least one audio service is present as a component of the current event, the MH_audio_descriptor( ) shall be used as a component_level_descriptor of the SMT.

The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event. Each field shown in the bit stream syntax of FIG. 18 will now be described in detail.

The descriptor_tag field is an 8-bit unsigned integer having a TBD value, which indicates that the corresponding descriptor is the MH_audio_descriptor( ). The descriptor_length field is also an 8-bit unsigned integer, which indicates the length (in bytes) of the portion immediately following the descriptor_length field up to the end of the MH_audio_descriptor( ). The channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

The sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B. The bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '0', the bit rate corresponds to an upper limit as defined in Table A3.4 of ATSC A/53B. The ISO_639_language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention. The MH_RTP_payload_type_descriptor( ) specifies the RTP payload type. Yet, the MH_RTP_payload_type_descriptor( ) exists only when the dynamic value of the RTP_payload_type field within the num_components loop of the SMT is in the range of '96' to '127'. The MH_RTP_payload_type_descriptor( ) is used as a component_level_descriptor of the SMT. The MH_RTP_payload_type_descriptor translates (or matches) a dynamic RTP_payload_type field value into (or with) a MIME type. Accordingly, the receiving system (or receiver) may collect (or gather) the encoding format of the IP stream component, which is encapsulated in RTP. The fields included in the MH_RTP_payload_type_descriptor( ) will now be described in detail. The descriptor_tag field corresponds to an 8-bit unsigned integer having the value TBD, which identifies the current descriptor as the MH_RTP_payload_type_descriptor( ). The descriptor_length field also corresponds to an 8-bit unsigned integer, which indicates the length (in bytes) of the portion immediately following the descriptor_length field up to the end of the MH_RTP_payload_type_descriptor( ). The RTP_payload_type field corresponds to a 7-bit field, which identifies the encoding format of the IP stream component. Herein, the dynamic value of the RTP_payload_type field is in the range of '96' to '127'. The MIME_type_length field specifies the length (in bytes) of the MIME_type field. The MIME_type field indicates the MIME type corresponding to the encoding format of the IP stream component, which is described by the MH_RTP_payload_type_descriptor( ).

FIG. 20 illustrates an exemplary bit stream syntax structure of an MH current event descriptor according to the present invention. The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel. The fields included in the MH_current_event_descriptor( ) will now be described in detail.

The descriptor_tag field corresponds to an 8-bit unsigned integer having the value TBD, which identifies the current descriptor as the MH_current_event_descriptor( ). The descriptor_length field also corresponds to an 8-bit unsigned integer, which indicates the length (in bytes) of the portion immediately following the descriptor_length field up to the end of the MH_current_event_descriptor( ). The current_event_start_time field corresponds to a 32-bit unsigned integer quantity. The current_event_start_time field represents the start time of the current event and, more specifically, as the number of GPS seconds since 00:00:00 UTC, Jan. 6, 1980. The current_event_duration field corresponds to a 24-bit field. Herein, the current_event_duration field indicates the duration of the current event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 21 illustrates an exemplary bit stream syntax structure of an MH next event descriptor according to the present invention. The optional MH_next_event_descriptor( ) shall be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel. The fields included in the MH_next_event_descriptor( ) will now be described in detail.

The descriptor_tag field corresponds to an 8-bit unsigned integer having the value TBD, which identifies the current descriptor as the MH_next_event_descriptor( ). The descriptor_length field also corresponds to an 8-bit unsigned integer, which indicates the length (in bytes) of the portion immediately following the descriptor_length field up to the end of the MH_next_event_descriptor( ). The next_event_start_time field corresponds to a 32-bit unsigned integer quantity. The next_event_start_time field represents the start time of the next event and, more specifically, as the number of GPS seconds since 00:00:00 UTC, Jan. 6, 1980. The next_event_duration field corresponds to a 24-bit field. Herein, the next_event_duration field indicates the duration of the next event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 22 illustrates an exemplary bit stream syntax structure of an MH system time descriptor according to the present invention. The MH_system_time_descriptor( ) shall be used as the ensemble_level_descriptor( ) within the SMT. Herein, the MH_system_time_descriptor( ) provides information on current time and date. The MH_system_time_descriptor( ) also provides information on the time zone in which the transmitting system (or transmitter) transmitting the corresponding broadcast stream is located, while taking into consideration the mobile/portable characterstics of the MH service data. The fields included in the MH_system_time_descriptor( ) will now be described in detail.

The descriptor_tag field corresponds to an 8-bit unsigned integer having the value TBD, which identifies the current descriptor as the MH_system_time_descriptor( ). The descriptor_length field also corresponds to an 8-bit unsigned integer, which indicates the length (in bytes) of the portion immediately following the descriptor_length field up to the end of the MH_system_time_descriptor( ). The system time field corresponds to a 32-bit unsigned integer quantity. The system_time field represents the current system time and, more specifically, as the number of GPS seconds since 00:00:00 UTC, Jan. 6, 1980. The GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

The time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, the time_zone_offset_polarity field value is added to the UTC time value. Conversely, when the value of the time_zone_offset_polarity field is equal to '1', this indicates that the time on the current time zone falls behind the UTC time. Therefore, the time_zone_offset_polarity field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time. The daylight_savings field corresponds to a 16-bit field providing information on the Summer Time (i.e., the Daylight Savings Time). The time_zone field corresponds to a (5×8)-bit field indicating the time zone, in which the transmitting system (or transmitter) transmitting the corresponding broadcast stream is located.

Figure 23:
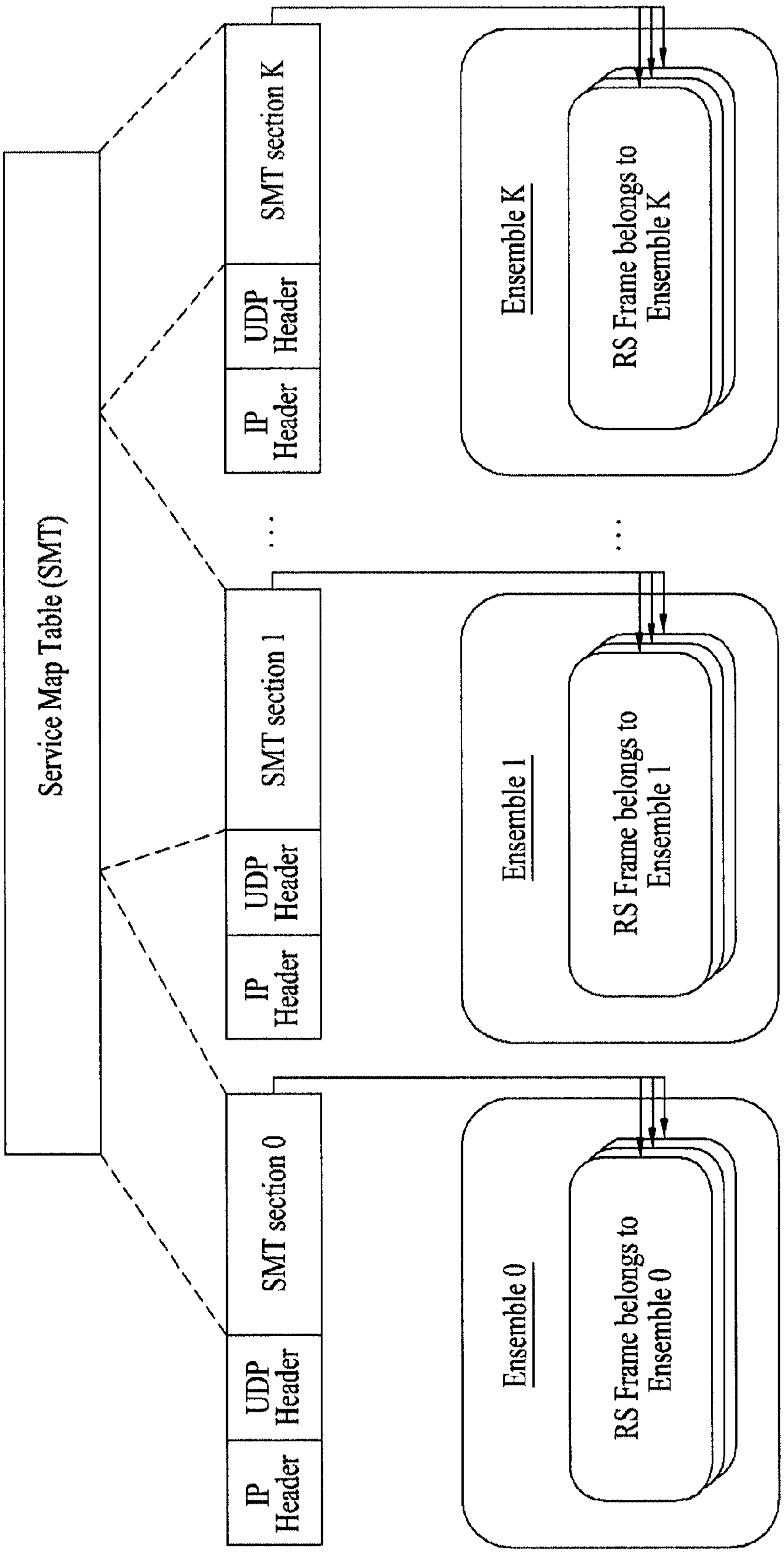
FIG. 23 illustrates segmentation and encapsulation processes of a service map table according to the present invention.

FIG. 23 illustrates segmentation and encapsulation processes of a service map table (SMT) according to the present invention. According to the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section. According to the embodiment of the present invention, by informing the receiving system of the target IP address and target UDP port number, the corresponding data (i.e., target IP address and target UDP port number) may be parsed without having the receiving system to request for other additional information.

Figure 24:
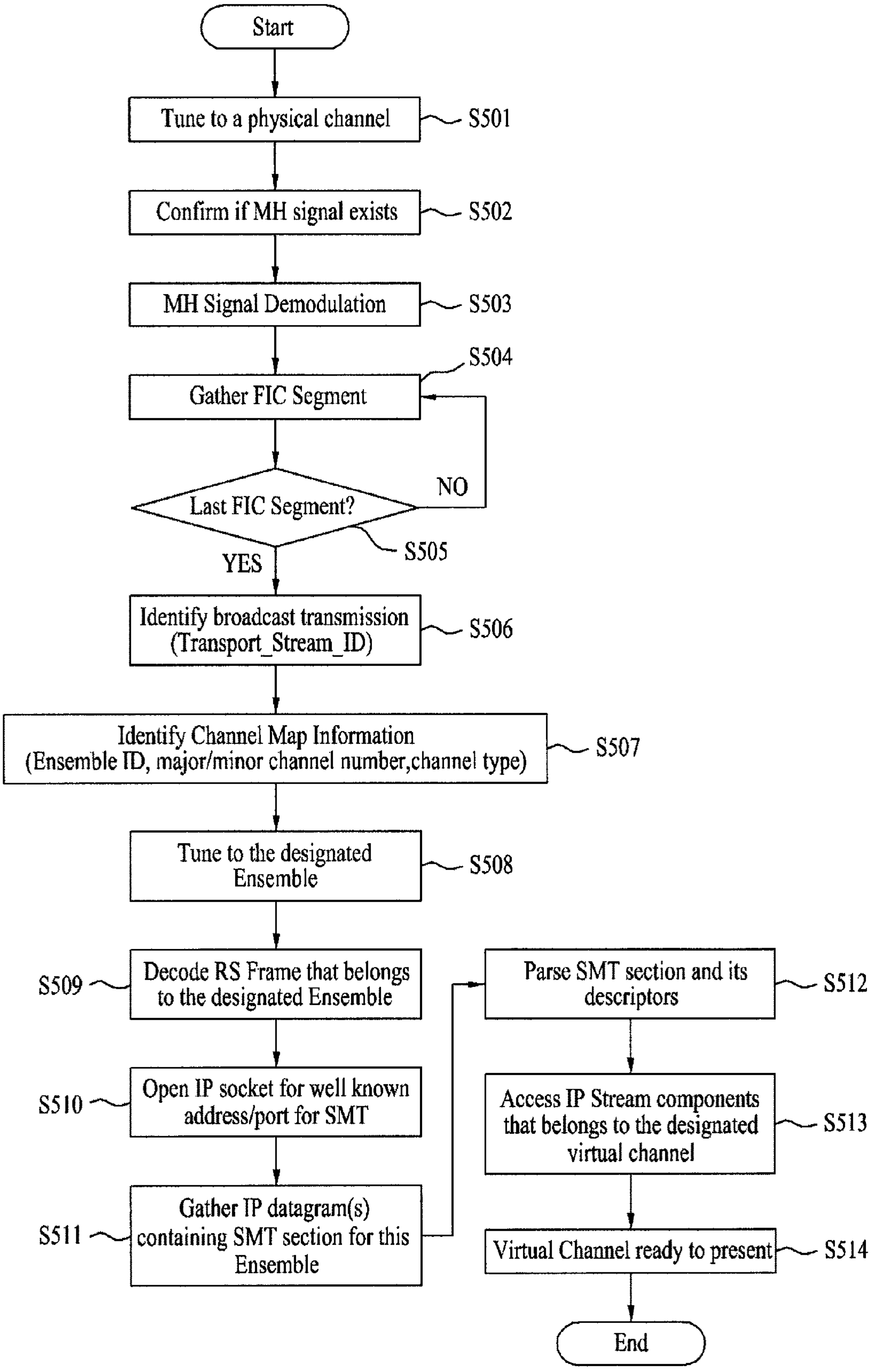
FIG. 24 illustrates a flow chart for accessing a virtual channel using FIC and SMT according to the present invention.

FIG. 24 illustrates a flow chart for accessing a virtual channel using FIC and SMT according to the present invention. More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505). According to the embodiment of the present invention, an FIC segment is inserted in a data group, so as to be transmitted. More specifically, the FIC segment corresponding to each data group described service information on the MH ensemble to which the corresponding data group belongs.

When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments. Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510). According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MH ensemble including the corresponding SMT section. At least one SMT section describing the MH ensemble is included in each RS frame included in the corresponding MH ensemble. Also, each SMT section is identified by an ensemble_id included in each section. Furthermore each SMT provides IP access information on each virtual channel subordinate to the corresponding MH ensemble including each SMT. Finally, the SMT provides IP stream component level information required for the servicing of the corresponding virtual channel. Therefore, by using the information parsed from the SMT, the IP stream component belonging to the virtual channel requested for reception may be accessed (S513). Accordingly, the service associated with the corresponding virtual channel is provided to the user (S514).

Meanwhile, the present invention enables notification information to be transmitted/received as well as a mobile broadcast service.

According to one embodiment of the present invention, a notification channel for transmitting a notification message only is assigned as well as a channel for a mobile broadcast service and the notification message containing a notification content is transmitted and received via the notification channel.

According to one embodiment, the notification channel is available for transmission and reception of an emergency alert system (EAS) data.

According to another embodiment, the notification channel is available for an ESG update usage. For instance, in case of an ESG update due to an unexpected program schedule change or the like, a receiving system receives the corresponding ESG update information in a message format via a notification channel only and is then able to efficiently operate an ESG update and management.

EAS data, ESG update information and the like in the notification message transmitted on the notification channel are examples to help the understanding of the present invention. There exist more various and wider applications of the notification message types transmittable on the notification channel, which further enhances embodiments of the present invention.

The present invention provides a presence or non-presence of a notification channel and location information of the corresponding notification channel via a fast information channel (FIC), thereby enabling a receiving system to access the notification channel. In the present invention, FIC data describes ensemble information to which a notification channel within a corresponding physical channel belongs for example. The FIC data of the present invention can further include identification information indicating whether a corresponding notification channel has an emergency property.

A receiving system according to the present invention is able to collect and process information of a notification channel in a manner of parsing an access table (notification access table: NAT) received by being included in an RS frame. And, the receiving system according to the present invention is able to collect and process information of each virtual channel in a manner of parsing SMT received by being included in an RS frame.

In the present invention, a virtual channel service, a mobile service or an MH service is used for the same meaning.

Figure 25:
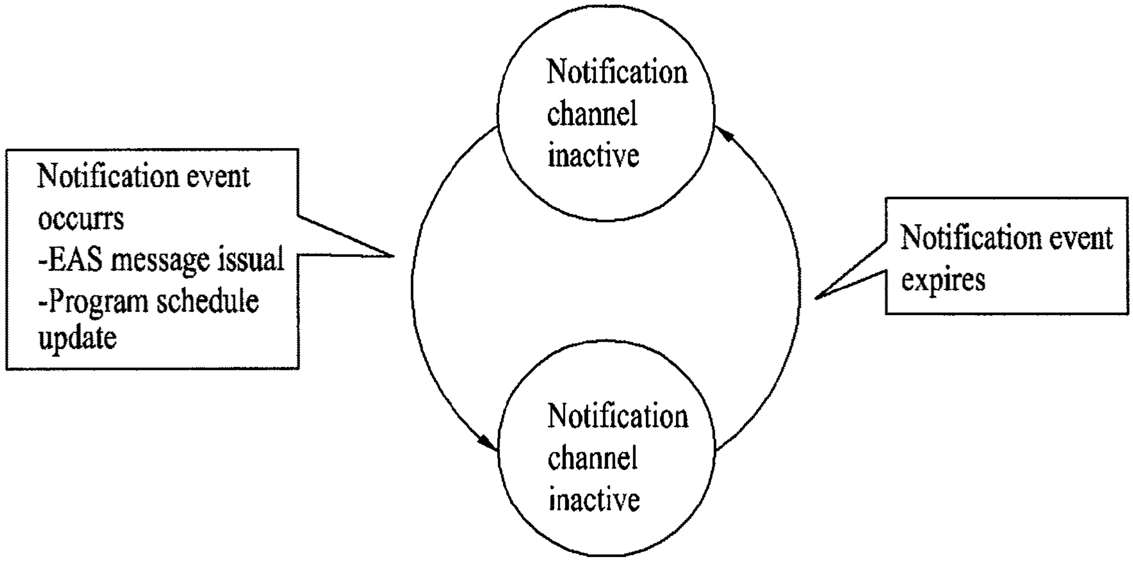
FIG. 25 is a diagram for an example of an operating method of a notification channel according to the present invention.

FIG. 25 is a diagram for an example of an operating method of a notification channel according to the present invention.

Referring to FIG. 25, if there is no notification message to be transmitted, a notification channel in an MH system exists in an inactive mode. If a notification message such as EAS data, program schedule update information or the like occurs, the notification channel enters an active mode. The corresponding notification message is sent via the corresponding notification channel.

FIG. 26 is a diagram of a syntax structure for FIC segment according to another embodiment of the present invention.

In the present invention, a single FIC segment is inserted in a single data group and is then transmitted for example. In this case, a receiving system receives a slot corresponding to each data group by a slicing scheme. In this case, corresponding FIC segments are interleaved by MH subframe unit to construct an FIC body. The FIC body, which is the collection of the FIC segments, provides channel numbers of virtual channels included in a whole physical channel for transmitting the corresponding FIC and an identifier of an ensemble to which each of the virtual channels belongs, thereby playing a role in binding the virtual channels to the ensembles, respectively. In case of using the FIC, information of the FIC segment is basically transmitted once per MH subframe at least. Yet, its region is extensible in a manner that it is interleaved per MH frame if a data size of FIC exceeds it. Moreover, if information of the FIC body amount to 37 bytes or more, it is transmitted in a manner of being divided by FIC segment unit to spread across all data groups within an MH subframe.

In particular, a maximum size of a single FIC segment unit amounts to 37 bytes and the FIC segment includes an FIC segment header and an FIC segment payload. For instance, each FIC segment can include a 4-byte FIC segment header and a 33-byte FIC segment payload.

Meanwhile, according to one embodiment, if a size of a single FIC segment fails to amount to 37 bytes, a rest part of the corresponding FIC segment payload can be stuffed with stuffing data to achieve 37 bytes.

The above-explained respective byte values (FIC segment: 37 bytes, FIC segment header: 4 bytes, FIC segment payload: 33 bytes) are just exemplary, by which the present invention is non-limited.

The FIC segment header can include FIC_type field, ESG_version field, Transport_Stream_ID field, FIC_seg_number field and FIC_last_seg_number field. The respective fields are described as follows.

First of all, the FIC_type field (2 bits) indicates a type of a corresponding FIC.

The ESG_version field (5 bits) indicates version information of ESG transmitted as EDC. For instance, version information of a service guide announcement channel of a corresponding ESG is represented in the ESG_version field, whereby a receiving system is able to know a presence or non-presence of an update of the ESG regardless of a presence or non-presence of EDC reception.

The Transport_Stream_ID field (16 bits) indicates an identifier of a globally unique broadcast stream that carries a corresponding FIC segment. Namely, the corresponding FIC segment provides identification of a broadcast stream carrying a corresponding FIC via the Transport_Stream_ID field.

The FIC_seg_number field (4 bits) indicates a number of a corresponding FIC segment when a single FIC body is carried by being divided into several FIC segments.

The FIC_last_seg_number field (4 bits) indicates a number of a last FIC segment of a corresponding FIC body.

The FIC segment payload can be constructed with an ensemble loop region (or a second region) and a channel loop region (or a third region). The ensemble loop region is repeated as many as the number of ensembles (NumEnsembles) described in a corresponding FIC segment. And, the channel loop region is repeated as many as the number of virtual channels (NumChannels) described in a corresponding ensemble.

The ensemble loop region can include Ensemble_id field, SI_Version field and Numchannels field.

The Ensemble_id field (8 bits) indicates an identifier of an ensemble carrying mobile service explained in the following description. Namely, the Ensemble_id field plays a role in binding mobile services and an ensemble together.

The SI_Version field (4 bits) indicates version information of SI data of a corresponding ensemble transmitted within an RS frame.

The Numchannels field (8 bits) indicates the number of virtual channels that are transmitted via a corresponding ensemble.

The channel loop region can include Channel_type field, Emergency_Indicator field, Channel_Activity field, CA_Indicator field, Stand_alone_Service_Indicator field, major_channel_num field and minor_channel_num field.

The Channel_type field (3 bits) indicates a service type of a corresponding virtual channel. In particular, an FIC segment indicates an attribute of a corresponding virtual channel via the Channel_Type field. The value allocation and meaning of the Channel_Type field shall be explained in detail with reference to FIG. 27 later.

The Emergency_Indicator field (1 bit) indicates whether a service of a corresponding virtual channel includes an EAS message or whether a corresponding service has an emergency property.

The Channel_Activity field (2 bits) indicates a presence or non-presence of activity of a corresponding virtual channel. If a value of the Channel_Activity field is parsed, it is able to know whether a corresponding virtual channel currently provides a service.

The value allocation and meaning of the Channel_Activity field will be explained with reference to FIG. 28 later.

The CA_Indicator field (1 bit) indicates whether a conditional access (CA) is applied to a corresponding virtual channel. If CA is applied to a corresponding virtual channel, a value of the CA_indicator field is set to 1 for example.

The stand_alone_service_indicator field (1 bit) indicates a service of a corresponding virtual channel is a stand-alone service. If a corresponding virtual channel is a stand-alone service, a value of the stand_alone_service_indicator field is set to 1 for example.

The major_channel_num field (8 bits) indicates a major channel number of a corresponding virtual channel.

And, the minor_channel_num field (8 bits) indicates a minor channel number of a corresponding virtual channel.

If a data size of a corresponding FIC segment is smaller than 37 bytes, stuffing data may exist in the rest part of the corresponding FIC segment.

FIG. 27 shows one embodiment for the value allocation and meaning of the Channel_Type field included in the channel loop region.

Referring to FIG. 27, the channel_type field can indicate an audio/video channel, an audio/video and data channel, an audio dedicated channel, a data dedicated channel, a file download channel, an ESG delivery channel, a notification channel or the like. For instance, if a value of the Channel_Type field is set to 110, it means that a corresponding virtual channel is a notification channel.

FIG. 28 is a diagram of one embodiment for the value allocation and meaning of the Channel_Activity field.

Referring to FIG. 28, if a value of the Channel_Activity field is set to 00, it indicates that a corresponding virtual channel is in an active mode and is providing a service. And, it also indicates that guide information for the virtual channel is currently provided via an ESG channel.

If a value of the Channel_Activity field is set to 01, it indicates that a corresponding virtual channel is in an inactive mode and does not provide a service. Yet, guide information on the virtual channel can be provided through ESG. In this case, although a receiving system is unable to tune to the virtual channel, it may be able to provide guide information on the corresponding virtual channel.

If a value of the Channel_Activity field is set to 10, it indicates that a corresponding virtual channel is a hidden channel. In this case, the corresponding virtual channel is currently in an inactive mode and does not provide a service. And, guide information on the corresponding virtual channel is not provided. Hence, if a receiving system is not designated for a specific service on a hidden channel, the receiving system is neither able to tune to the virtual channel nor is able to provide a user with guide information on the corresponding virtual channel.

If a value of the Channel_Activity field is set to 11, it indicates that a corresponding virtual channel is a software download channel. In this case, a receiving system is neither able to tune to a corresponding virtual channel for a general service consumption nor is able to provide a user with guide information on the corresponding virtual channel.

Figure 29:
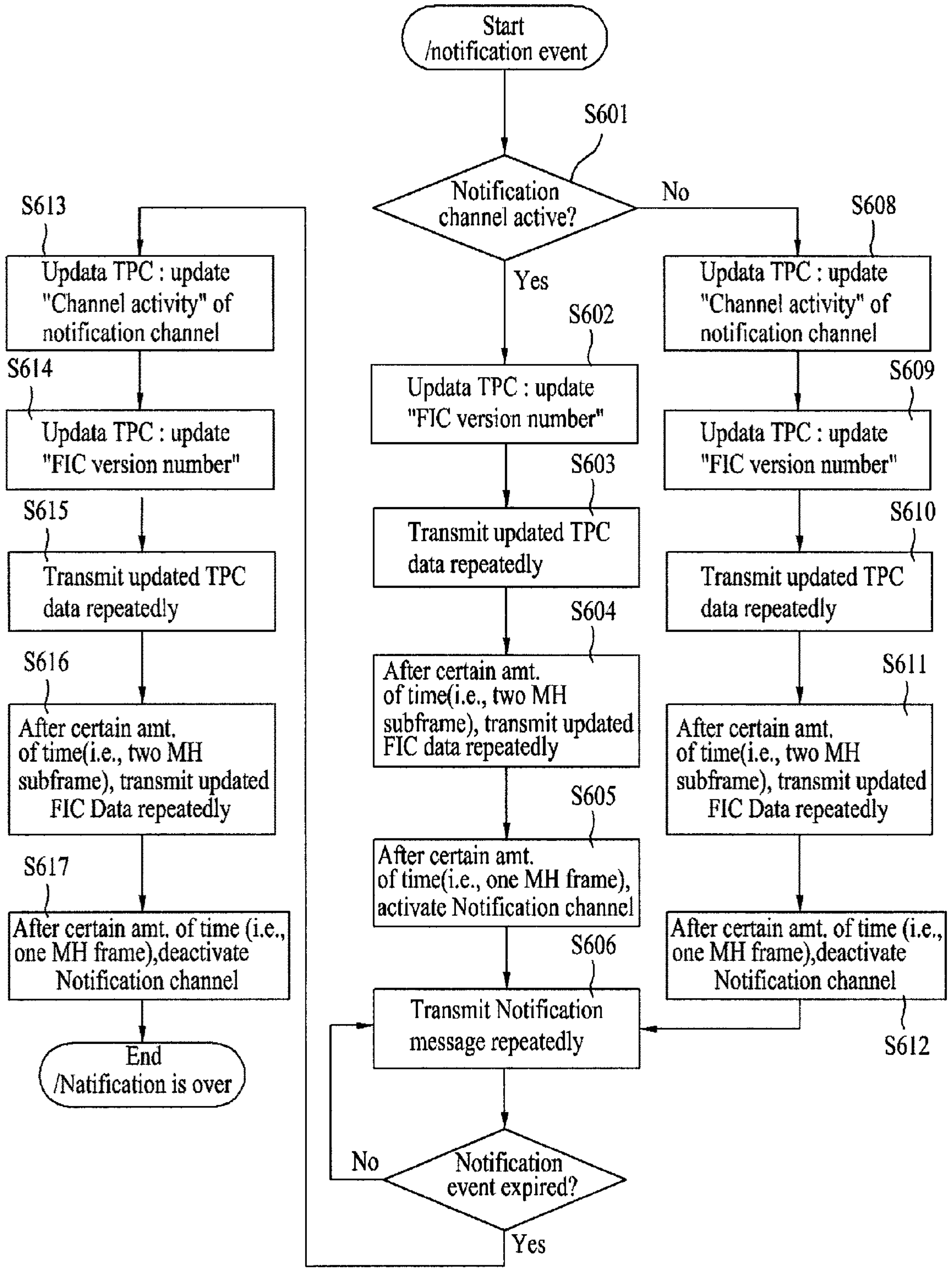
FIG. 29 is a flowchart for an operation of a notification channel for a notification message delivery in a transmitting side according to one embodiment of the present invention.

FIG. 29 is a flowchart for an operation of a notification channel for a notification message delivery in a transmitting side according to one embodiment of the present invention.

Referring to FIG. 29, if such a notification event as EAS data or program schedule update information transmission and the like occurs, it is checked whether a notification channel is in an active mode (S601). If the notification channel is in the active mode, TPC is updated in a manner of updating an FIC Version number within the TPC (S602). The updated TPC data is then repeatedly transmitted (S603). In this case, the FIC Version number indicates a version number of an FIC body that is an FIC transmission structure body carried on a corresponding physical channel. After a certain amount of time (i.e., two subframes), the updated FIC data is repeatedly transmitted (S604). Subsequently, after a certain amount of time (e.g., one MH frame), the notification channel is activated (S605). A corresponding notification message is repeatedly transmitted on the activated notification channel (S606).

If the notification channel is in an inactive mode, FIC is updated in a manner of updating Channel_Activity field of a notification channel for transmitting a notification message within the FIC (S608). Namely, a value of the Channel_Activity field is set to a value (e.g., 00) for instructing channel activation. After TPC data has been updated in a manner of updating FIC Version number within the TPC (S609), the updated TPC data is repeatedly transmitted (S610). After a certain amount of time (i.e., two subframes), the updated FIC data is repeatedly transmitted (S611). Subsequently, after a certain amount of time (e.g., one MH frame), the notification channel is activated (S612). A corresponding notification message is repeatedly transmitted on the activated notification channel (S606).

While the notification message is repeatedly transmitted in the step S606, it is checked whether the notification event expired (S607).

If the step S607 determines that the notification event has expired, FIC is updated in a manner of updating the Channel_Activity field of the notification channel within the FIC (S613). Namely, a value of the Channel_Activity field is set to a value for instructing channel deactivation (e.g., 01). After the TPC has been updated by updating FIC Version number within the TPC (S614), the updated TPC data is repeatedly transmitted (S615). After a certain amount of time (i.e., two subframes), the updated FIC data is repeatedly transmitted (S616). Subsequently, after a certain amount of time (e.g., one MH frame), the notification channel is deactivated (S617). A corresponding notification message is not transmitted until a next notification event occurs.

Thus, since the present invention is able to obtain a presence or non-presence of a notification channel, activation or deactivation of the notification channel, ensemble information having the notification channel belong thereto, a notification channel number and the like through FIC (fast information channel), a receiving system is able to receive an ensemble including the notification channel by time slicing scheme in a manner of parsing the FIC.

According to one embodiment of the present invention, notification information including access information for receiving the notification message transmitted on the notification channel is transmitted in a manner of being described in a notification access table (NAT). Details of the NAT shall be explained with reference to FIG. 34 later.

For example, the NAT is received by being included in an RS frame of an ensemble to which a corresponding notification channel belongs. In particular, a receiving system is able to collect and process information of the notification channel in a manner of parsing the NAT received by being included in an RS frame. And, the receiving system is able to collect and process information of each virtual channel in a manner of parsing SMT received by being included in an RS frame.

The RS frame is a set of at least one or more data groups. IP streams of each service or ESG are included in a single RS frame and SMT section data may exist in very RS frame. If the RS frame is an RS frame that corresponds to an ensemble to which a notification channel belongs, NAT section data exists in the RS frame. And, the RS frame may include a notification message. In particular, the notification message is can be received in a manner of being encapsulated according to an RTP protocol or a FLUTE protocol and being then included in the RS frame in an IP stream format having UDP/IP header attached thereto.

A length (i.e., the number of rows) of a column in a single RS frame is determined as 187 bytes. A length of row amounts to N bytes. In this case, the 'N' may vary according to TPC data. The TPC data can include MH-Ensemble ID, MH-Subframe Number, TNoG (Total Number of MH-Groups), RS frame Continuity Counter, N (Column Size of RS-frame), FIC Version Number and the like. And, the N may vary according to a region within a data group to which the RS frame will be allocated. This is because error occurrence probability decreases in order of regions A>B>C>D within the data group. In the present invention, the N is equal to or greater than 187 for example. In particular, a single RS frame has a byte size of N(row)×187(columns).

For clarity and convenience of description, each of the N-byte rows is named an MH transport packet (TP). The MH TP can include a 2-byte header and an (N−2)-byte MH payload. In this case, two bytes are allocated to an MH header region for example, which may be varied by a designer and by which the present invention is non-limited.

The MP payload can include a signaling information (SI) table such as SMT, NAT and the like as well as IP datagram. In particular, a single MH payload includes IP datagram only, includes an SI table only, or includes both of the IP datagram and the SI table.

Figure 30:
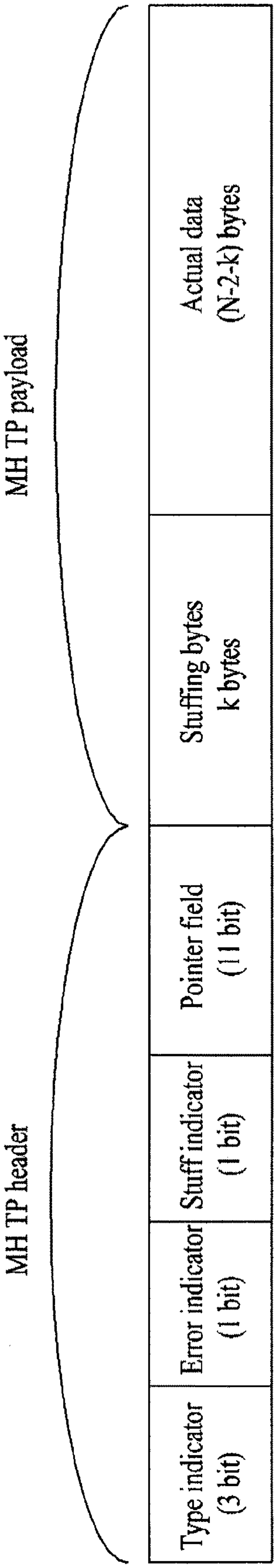
FIG. 30 is a diagram of MH header and MH payload format of MH TP according to one embodiment of the present invention.

FIG. 30 is a diagram of MH header and MH payload format of MH TP according to one embodiment of the present invention.

Referring to FIG. 30, the MH header is able to include a type_indicator field, an error_indicator field, a stuff_indicator field and a pointer field.

Three bits can be allocated to the type_indicator field for example. And, the type_indicator field indicates a type of data allocated to an MH payload within a corresponding MH TP. In particular, the type_indicator field indicates whether data of the payload includes IP datagram or a signaling information (SI) table. In this case, each data type configures a single logical channel. On a logical channel for transmitting IP datagram, several mobile services can be transmitted by being multiplexed together. And, each of the mobile services undergoes demultiplexing in an IP layer.

One bit can be allocated to the error_indicator field for example. The error_indicator field indicates a presence or non-presence of error of a corresponding MH TP. For instance, if a value of the error_indicator field is set to 0, it means that error does not exist in the corresponding MH TP. If a value of the error_indicator field is set to 1, it means that error exists in the corresponding MH TP.

One bit can be allocated to the stuff_indicator field for example. The stuff_indicator field indicates whether a stuffing byte exists in an MH payload of a corresponding MH TP. For instance, if a value of the stuff_indicator field is set to 0, it means that the stuffing byte does not exist in the corresponding MH TP. If a value of the stuff_indicator field is set to 1, it means that the stuffing byte exists in the corresponding MH TP.

If the stuff_indicator value indicates that the stuffing byte does not exist in the MH payload of the corresponding MH TP (i.e., 0), the stuffing byte is not allocated to the MH payload of the corresponding MH TP but (N−2) IP datagram (or SI table) bytes are allocated to the MH payload of the corresponding MH TP. If the stuff_indicator value indicates that the stuffing byte exists in the MH payload of the corresponding MH TP (i.e., 1), k stuffing bytes and (N−2−k) IP datagram (or SI table) bytes are allocated to the MH payload of the corresponding MH TP. In this case, $0 \leqq k \leqq (N-2)$.

Eleven bits can be allocated to the pointer field. And, the pointer field indicates position information from which new data (i.e., new SI table or new IP datagram) starts in a corresponding MH TP.

FIG. 31 is a diagram of one embodiment for the value allocation and meaning of type_indicator field included in the MH header shown in FIG. 30.

Figure 32:
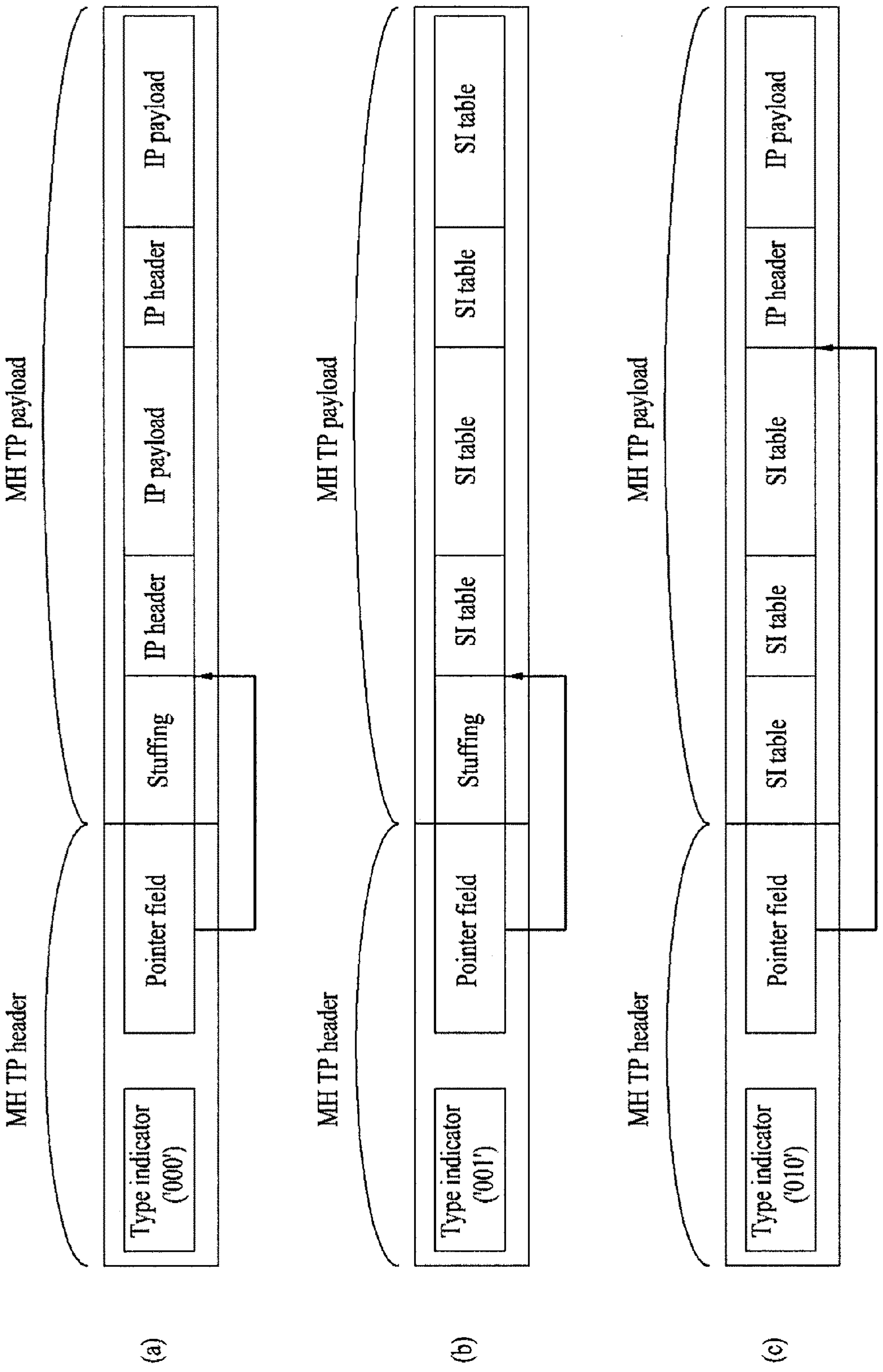
FIG. 32 is a diagram for usage examples of a pointer field included in the MH header shown in FIG. 30.

Referring to FIG. 31, if a value of the type_indicator field is set to 000, it indicates that an MH payload of a corresponding MH TP includes at least one or more IP datagrams. In this case, the pointer field value, as shown in (a) of FIG. 32, indicates a starting point of a first newly started IP datagram.

If a value of the type_indicator field is set to 001, it indicates that an MH payload of a corresponding MH TP includes at least one or more SI tables. In this case, the pointer field, as shown in (b) of FIG. 32, points the starting point of the first newly started SI Table.

If a value of the type_indicator field is set to 010, it indicates that an MH payload of a corresponding MH TP includes at least one or more IP datagrams and at least one or more SI tables. In this case, the pointer field points the starting point of the first newly started IP Datagram. In this case, stuffing data is not allowed.

And, the type_indicator field values 011~111 are reserved for future use.

The order, position and meaning of the field allocated to the MH header within the MH TP shown in FIG. 31 are just exemplary to help the understanding of the present invention. As the order, positions and meanings of the fields allocated to the MH header within the MH TP and the number of additionally allocated fields are easily modified by those who skilled in the art, the present invention is not limited to the above embodiment.

FIG. 33 is a diagram for a syntax structure of SMT according to another embodiment of the present invention.

Referring to FIG. 33, an SMT is written in MPEG-2 private section format to help the understanding of the present invention. Since any format is available for the format of the SMT, the scope of the present invention is non-limited by this embodiment.

The SMT includes description information of each virtual channel within a single MH ensemble and other additional informations can be included in a descriptor region. The SMT is transmitted to a receiving system by a transmitting system by including at least one field. The SMT shown in FIG. 33 differs from the former SMT shown in FIG. 17 in contents included in access information of virtual channels and access information of IP streams. For instance, the former SMT shown in FIG. 17 provides source IP access information if a source IP address of a corresponding virtual channel exists for a specific multicast source. Yet, the latter SMT shown in FIG. 33 does not provide the source IP access information. Moreover, although the former SMT shown in FIG. 17 provides a presence or non-presence of activation of a corresponding virtual channel, a service type and service identification information, the latter SMT shown in FIG. 33 does not provide them.

SMT section can be transmitted in a manner of being included as an SI table in an MH TP within an RS frame. In this case, the RS frame decoders 170 and 180 shown in FIG. 1 decode an inputted RS frame. The decoded RS frame is outputted to the corresponding RS frame handlers 211 and 212. Each of the RS frame handlers 211 and 212 configures an MH TP by discriminating the inputted RS frame by a row unit and then outputs the MH TP to the MH TP handler 213.

In case of deciding that the corresponding MH TP includes an SI table based on a header of each of the inputted MH TPs, the MH TP handler 213 parses the included SI table and then outputs the result to the physical adaptation control signal handler 216. Yet, this case corresponds to such a case that an SI table is not encapsulated with IP datagram.

Meanwhile, if the SI table is encapsulated with IP datagram, in case of deciding that the corresponding MH TP includes the SI table based on the header of each of the inputted MH TPs, the MH TP handler 213 outputs it to the IP network stack 220. If so, the IP network stack 220 performs IP and UDP processing on the SI table and then outputs it to the SI handler 240. The SI handler 230 parses the inputted SI table and then stores the result in the storage unit 290 or outputs the result to the physical adaptation control signal handler 216.

The physical adaptation control signal handler 216 checks an SMT via a table identifier of SI data outputted from the MH TP handler 213 or the SI handler 240 and then obtains a reception-specific virtual channel entry and IP access information using the checked SMT. This information can be stored in the storage unit 290. And, the IP network stack 220 accesses the corresponding IP stream only using this information.

Examples for the fields carried on the SMT are described as follows.

First of all, a table_id field (8 bits) is a field for identifying a table type, through which it is able to know this table is an SMT (table_id: An 8-bit unsigned integer number that indicates the type of table section being defined in Service Map Table (SMT)).

A section_syntax_indicator field (1 bit) is an indicator that defines a section format of SMT.

A private_indicator field (1 bit) indicates whether an SMT follows a private section or not.

A version_number field (5 bits) indicates a version number of an SMT.

A section_number field (8 bits) indicates a section number of a current SMT section.

A last_section_number field (8 bits) indicates a last section number of an SMT.

An ensemble_id field (8 bits) in the range 0x00 to 0x3F shall be the Ensemble ID associated with this MH Ensemble. The value of this field shall be derived from the parade_id carried from the baseband processor of MH physical layer subsystem, by using the parade_id of the associated MH Parade for the least significant 7 bits, and using '0' for the most significant bit when the MH Ensemble is carried over the Primary RS frame, and using '1' for the most significant bit when the MH Ensemble is carried over the Secondary RS frame.

Next to the ensemble_id field, 'for loop', which is repeated as many as the number of virtual channels (NumChannels) within a corresponding SMT section, is located. Using the 'for loop', information on a plurality of virtual channels is provided.

A transport_stream id field (16 bits) means a unique identifier of a broadcast stream carrying a corresponding SMT section. Namely, the transport_stream_id is a 16-bit unsigned integer number that identifies the broadcast transport stream that carries the service described below.

A source_id field indicates the programming source associated with the virtual channel. In this context, a source is one specific source of video, text, data, or audio programming. And, source ID value zero is reserved. Source ID values in the range 0x0001 to 0x0FFF shall be unique within the physical channel that carries the SMT, while values 0x1000 to 0xFFFF shall be unique at the regional level.

A major_channel_number field, which is an 8-bit unsigned integer field in the range 0x00 to 0xFF, shall represent the major channel number associated with this virtual channel.

A minor_channel_number field, which is an 8-bit unsigned integer field in the range 0x00 to 0xFF, shall represent the minor channel number associated with this virtual channel.

An ESG_requirement_flag field (1 bit) is a one-bit indicator, which when set to '1' indicates that information carried within the ESG is required to access this virtual channel.

A number_stream field (6 bits) indicates the number of IP streams within this virtual channel.

An IP_version_flag is a one-bit indicator, which when set to '1' indicates that target_IP_address field is an IPv6 address, and when set to '0' indicates that target_IP_address field is an IPv4 address.

If the IP_version_flag field (1 bit) is set to '0', the target_IP_address field indicates a 32-bit target IPv4 address for this virtual channel. If the IP_version_flag field is set to '1', the target_IP_address field indicates a 64-bit target IPv6 address for this virtual channel.

Next to the target_IP_address field, 'for loop', which is repeated as many as the number of IP streams (num_streams) within this virtual channel is located. Using the 'for loop', information on a plurality of IP streams is provided.

A stream_type field (8 bits) indicates a type of a corresponding IP stream.

A target_port_num field (8 bits) indicates a UDP port number of a corresponding IP stream.

If a value of the stream_type field indicates an audio, an ISO_639_language_code field is further included. The ISO_639_language_code field indicates a language of an audio IP stream.

Moreover, the SMT can further include a descriptor providing additional information on a corresponding virtual channel and/or a descriptor providing additional information on a corresponding ensemble.

FIG. 34 is a diagram of a syntax structure of NAT according to one embodiment of the present invention.

Referring to FIG. 34, an NAT is written in MPEG-2 private section format to help the understanding of the present invention. Since any format is available for the format of the NAT, the scope of the present invention is non-limited by this embodiment.

The NAT is received by being included in an RS frame of an ensemble for which a notification channel exists. And, the NAT describes notification message information for enabling a notification message, which is transmitted on a corresponding notification channel, to be received. In particular, the NAT provides access information for enabling a notification channel to be acceded within a corresponding ensemble.

For example, the NAT can be transmitted in a manner of being encapsulated with UDP/IP by having a target IP address and a target UDP port number on IP datagram. In particular, the NAT is segmented into a predetermined number of sections, is encapsulated with a UDP header, is encapsulated again with an IP header, and is then transmitted by being included in an MH TP within an RS frame. In this case, a target IP address and a target UDP port number the NAT section use well-known values, whereby a receiving system is able to receive the NAT section without separate IP access information.

For another example, the NAT section can be transmitted in a manner of being encapsulated in an SI table format with an MH TP within an RS frame. In this case, the RS frame decoders 170 and 180 shown in FIG. 1 decode an inputted RS frame. The decoded RS frame is outputted to the corresponding RS frame handlers 211 and 212. Each of the RS frame handlers 211 and 212 configures an MH TP by discriminating the inputted RS frame by a row unit and then outputs the MH TP to the MH TP handler 213.

In case of deciding that the corresponding MH TP includes an SI table based on a header of each of the inputted MH TPs, the MH TP handler 213 parses the included SI table and then outputs the result to the physical adaptation control signal handler 216. Yet, this case corresponds to such a case that an SI table is not encapsulated with IP datagram.

Meanwhile, if the SI table is encapsulated with IP datagram, in case of deciding that the corresponding MH TP includes the SI table based on the header of each of the inputted MH TPs, the MH TP handler 213 outputs it to the IP network stack 220. If so, the IP network stack 220 performs IP and UDP processing on the SI table and then outputs it to the SI handler 240. The SI handler 230 parses the inputted SI table and then stores the result in the storage unit 290 or outputs the result to the physical adaptation control signal handler 216.

The physical adaptation control signal handler 216 checks an NAT via a table identifier of SI data outputted from the MH TP handler 213 or the SI handler 240 and then obtains various kinds of informations (access information included) of a reception-specific notification channel using the checked NAT. This information can be stored in the storage unit 290. And, the IP network stack 220 accesses a notification message of the corresponding notification channel using this information.

Examples for the fields carried on the NAT are described as follows.

First of all, a table_id field (8 bits) is a field for identifying a table type, through which it is able to know this table is an NAT.

A section_syntax_indicator field (1 bit) is an indicator that defines a section format of NAT.

A private_indicator field (1 bit) indicates whether an NAT follows a private section or not.

A version_number field (5 bits) indicates a version number of an NAT.

A section_number field (8 bits) indicates a section number of a current NAT section.

A last_section_number field (8 bits) indicates a last section number of an NAT.

An ensemble_id field (8 bits) in the range 0x00 to 0x3F shall be the Ensemble ID associated with this MH Ensemble. The value of this field shall be derived from the parade_id carried from the baseband processor of MH physical layer subsystem, by using the parade_id of the associated MH Parade for the least significant 7 bits, and using '0' for the most significant bit when the MH Ensemble is carried over the Primary RS frame, and using '1' for the most significant bit when the MH Ensemble is carried over the Secondary RS frame.

A NumNotifSession field (8 bits) indicates the number of notification sessions described in the corresponding NAT section.

Next to the NumNotifSession field, 'for loop', which is repeated as many times as the number (NumNotifSession) of the notification sessions within a corresponding NAT section, is located. Using the 'for loop', information on a plurality of virtual channels is provided.

A transport_stream id field (16 bits) means a unique identifier of a broadcast stream carrying a corresponding NAT section. Namely, the transport_stream_id is a 16-bit unsigned integer number that identifies the broadcast transport stream that carries the notification messages described below.

A source_id field (16 bits) identifies the programming source associated with the notification session. In this context, a source is one specific source of video, text, data, or audio programming. And, source ID value zero is reserved. Source ID values in the range 0x0001 to 0x0FFF shall be unique within the physical channel that carries the NAT, while values 0x1000 to 0xFFFF shall be unique at the regional level.

A Notification_Type field (7 bits) indicates a type of a corresponding notification session.

An emergency field is a one-bit indicator, which when set to '1' indicates that this Notification session carries Notification messages with emergency property.

A NumNotifMsg field (8 bits) is an 8-bit unsigned integer which represents the number of Notification Messages carried in this Notification Session.

An IP_version_flag field is a one-bit indicator, which when set to '1' indicates that target_IP_address field is an IPv6 address, and when set to '0' indicates that target_IP_address field is an IPv4 address.

If the IP_version_flag field (1 bit) is set to '0', the target_IP_address field indicates a 32-bit target IPv4 address for a corresponding notification session. If the IP_version_flag field is set to '1', the target_IP_address field indicates a 64-bit target IPv6 address for corresponding notification session.

Next to the target_IP_address field, 'for loop', which is repeated as many times as the number of notification messages (NumNotifMsg) within a corresponding notification session, is located. Using the 'for loop', information on a plurality of notification messages is provided.

NotifMsg_type field (8 bits) indicates a type of a corresponding notification message.

A target_port_num field (8 bits) indicates a UDP port number for obtaining a corresponding notification message.

If a value of the NotifMsg_type field indicates an audio, an ISO_639_language_code field is further included. The ISO_639_language_code field indicates a language of an audio notification message.

Moreover, the NAT can further include a descriptor providing additional information on a corresponding notification session and/or a descriptor providing additional information on a corresponding ensemble.

FIG. 35 is a diagram of XML (extensible markup language) data structure for an example of a notification message (Notification_Message) according to the present invention. And, FIG. 36 is a diagram of the notification message (Notification_Message) shown in FIG. 3 in XML schema.

The notification message Notification_Message can include attributes and at least one Notification_Msg_Body element.

The notification message Notification_Message can include Notification_Msg_ID field, Notification_Msg_Version field, Emergency field, ValidFrom field, ValidTo field, Fragment_Number field and Last_Fragment_Number field, which are defined as the attributes.

The Notification_Msg_ID field indicates a value for identifying a corresponding notification message.

The Notification_Msg_Version field indicates a version of a corresponding notification message.

The Emergency field indicates whether a corresponding notification message is the message having an emergency attribute.

The ValidFrom field indicates that a corresponding notification message is valid from a prescribed timing point.

The ValidTo field indicates that a corresponding notification message is valid to a prescribed timing point.

The Fragment_Number field indicates an order of a predetermined fragment if a corresponding notification message is fragmented.

And, the Last_Fragment_Number field indicates an order of a last fragment of a corresponding notification message if the corresponding notification message is fragmented.

Figure 37:
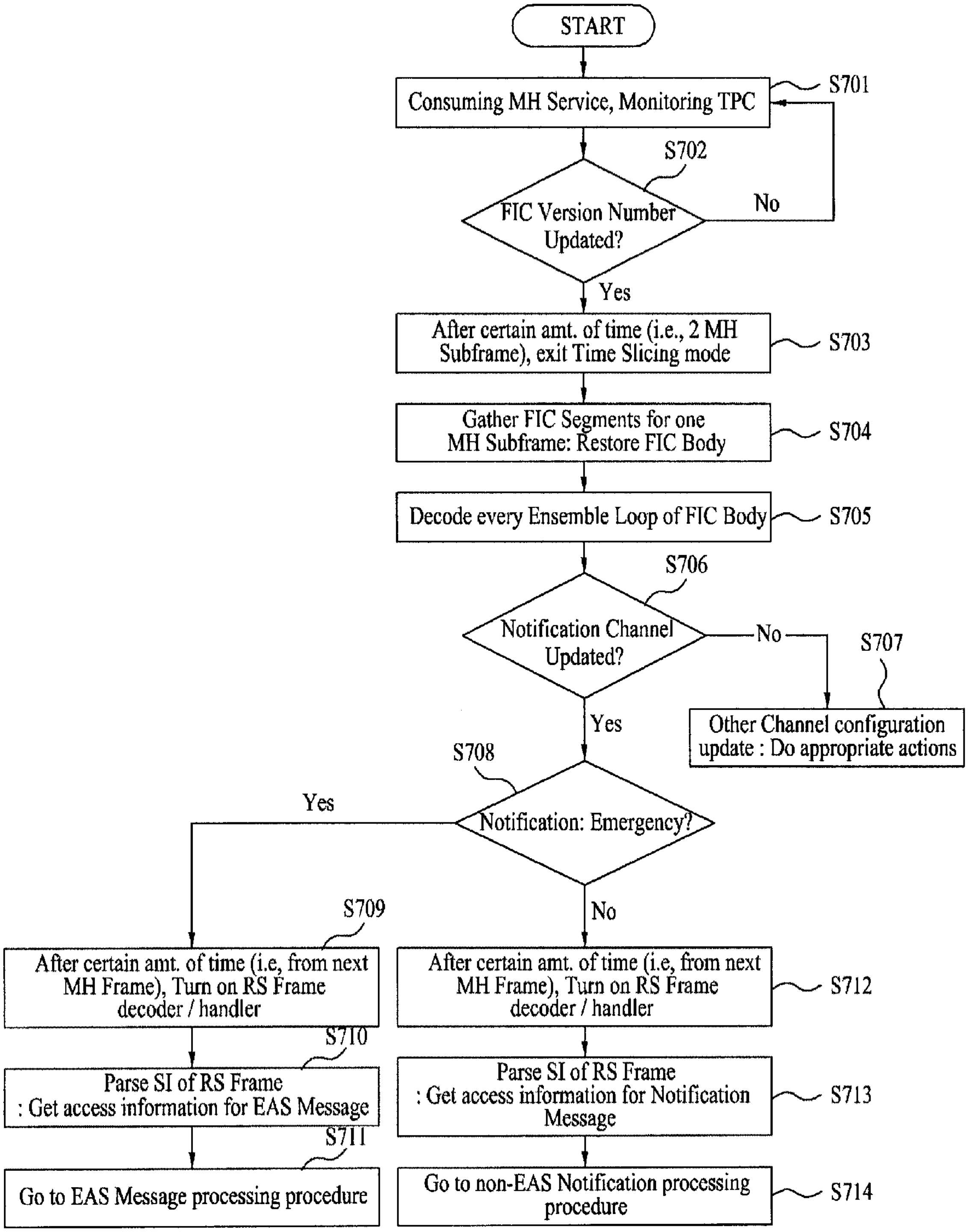
FIG. 37 is a flowchart for a method of accessing a notification message according to one embodiment of the present invention.

FIG. 37 is a flowchart for a method of accessing a notification message according to one embodiment of the present invention. In particular, a receiving system is able to access a notification message that is received on a notification channel in the course of providing a mobile service to a user.

Referring to FIG. 37, TPC is being monitored while a mobile service is provided (S701). If an FIC version number included in the TPC is updated (S702), a time slicing mode is exited after a certain amount of time (e.g., two subframes) (S703). An FIC body is then configured in a manner of gathering FIC segments within a single subframe and then performing de-interleaving on the gathered FIC segments (S704). By decoding every ensemble loop of the FIC body configured in the step S704, it is checked whether a notification channel is updated (S706). The update of the notification channel can be confirmed by parsing one of Channel_Type field, Emergency_Indicator field, Channel_Activity field and the like.

If it is checked that the notification channel is not updated in the step S706, appropriate actions are performed (S707). If it is checked that the notification channel is updated in the step S706, it is checked whether a notification message transmitted on the updated notification channel has an emergency attribute (S708). For instance, when a value of the Channel_Type field indicates that a corresponding virtual channel is the notification channel, if the Emergency_Indicator field is parsed, it is able to decide whether the notification message transmitted on the corresponding notification channel has the emergency attribute. In particular, it is able to decide whether the notification message includes an EAS message.

If the step S708 checks that the corresponding notification message has the emergency attribute, the RS frame decoder and the RS frame handler are turned on after a certain amount of time (e.g., a next MH frame) (S709). For instance, if the RS frame of the ensemble, to which the notification channel belongs, is a secondary RS frame, the secondary RS frame decoder 180 and the secondary frame handler 212 are turned on.

Subsequently, by referring to an MH header of an MH TP of the RS frame processed by the turned-on RS frame decoder and the turned-on RS frame handler, an SI table (e.g., NAT) is parsed from the RS frame. Access information for receiving a notification message (e.g., an EAS message) having an emergency attribute is obtained from the parsed SI data (S710). After the EAS message transmitted on the corresponding notification channel has been accessed using the access information, the accessed EAS message is processed (S711).

If the step S708 checks that the corresponding notification message does not have the emergency attribute, the RS frame decoder and the RS frame handler are turned on after a certain amount of time (e.g., a next MH frame) (S712). For instance, if the RS frame of the ensemble, to which the notification channel belongs, is a secondary RS frame, the secondary RS frame decoder 180 and the secondary frame handler 212 are turned on.

Subsequently, by referring to an MH header of an MH TP of the RS frame processed by the turned-on RS frame decoder and the turned-on RS frame handler, an SI table (e.g., NAT) is parsed from the RS frame. Access information for receiving a notification message (e.g., ESG schedule update information) having no emergency attribute is obtained from the parsed SI data (S713). After the notification message transmitted on the corresponding notification channel has been accessed using the access information, the accessed notification message is processed (S714).

In FIG. 37, for instance, the steps S701 and S704 are performed by the signaling decoder 190, the step S703 is performed by the operation controller 110, the steps S705, S706 and S708 are performed by the TPC handler 214 and the FIC handler 215, and the steps S709 to S714 are performed by the RS frame decoder and the RS frame handler.

Figure 38:
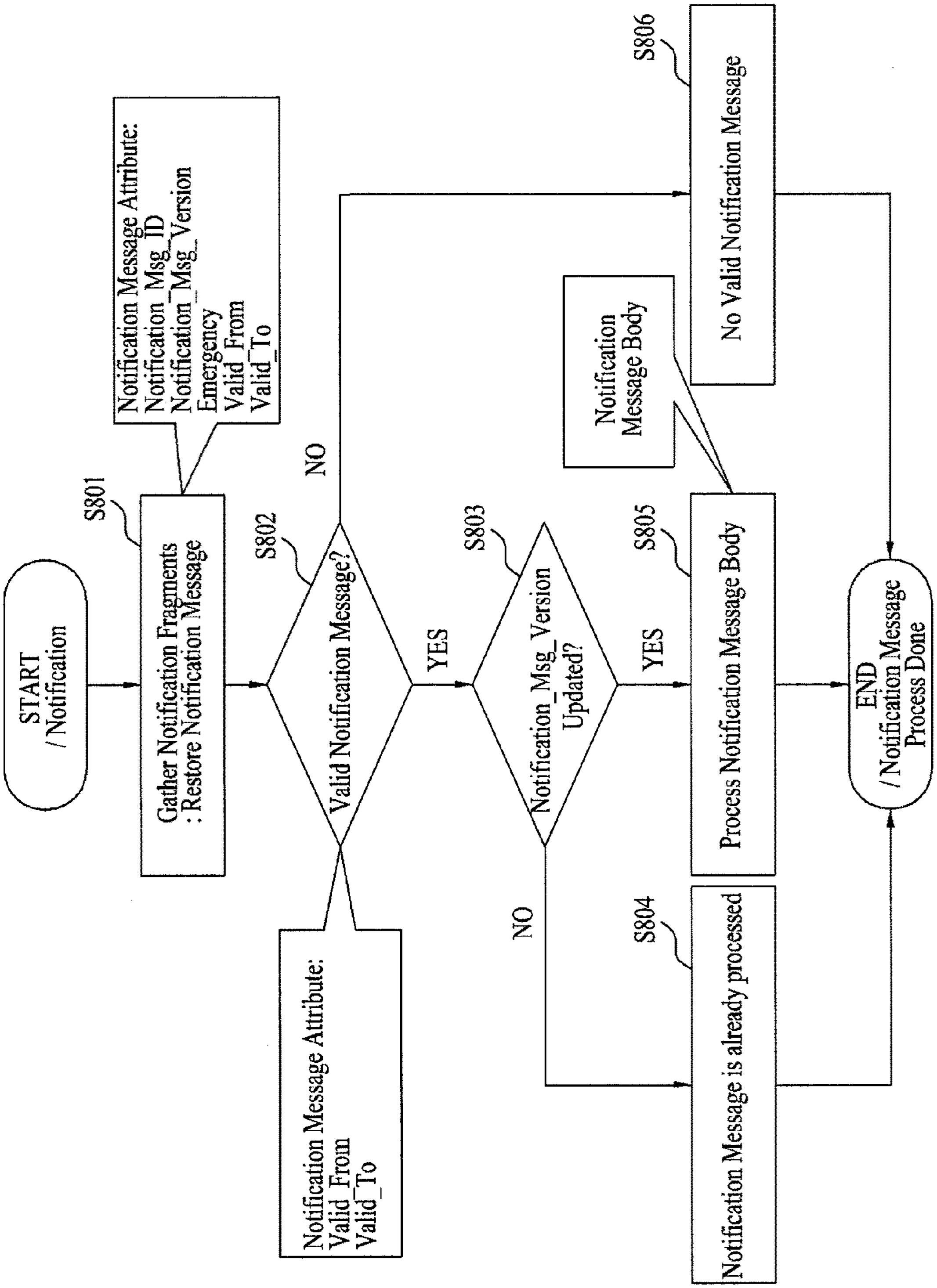
FIG. 38 is a flowchart for a method of processing an accessed notification message according to one embodiment of the present invention.

FIG. 38 is a flowchart for a method of processing an accessed notification message according to one embodiment of the present invention.

Referring to FIG. 38, if a notification message is accessed from a corresponding notification channel, the notification message is configured by gathering notification fragments (S801). The notification message can include Notification_Msg_ID field, Notification_Msg_Version field, Emergency field, ValidFrom field, ValidTo field, Fragment_Number field and Last_Fragment_Number field, which are defined as attributes. If the Fragment_Number field and the Last_Fragment_Number field are parsed, it is able to configure a notification message by gathering at least one or more fragments.

If the notification message is configured in the step S801, it is checked whether the configured notification message is valid (S802). The validity or invalidity of the notification message can be obtained by parsing the ValidFrom field and the ValidTo field.

If the step S802 checks that the notification message is valid, it is checked whether a version of the notification message is updated in a manner of parsing the Notification_Msg_Version field (S803). If the step S803 checks that the version of the notification message is not updated, it means the same notification message is already being processed. Hence, the accessed notification message is ignored (S804).

Meanwhile, if the step S803 checks that the version of the notification message was updated, a notification body element (Notification_Msg_Body) of the accessed notification message is processed (S805). If the step S802 checks that the notification message is invalid, the accessed notification message is ignored (S806).

Figure 39:
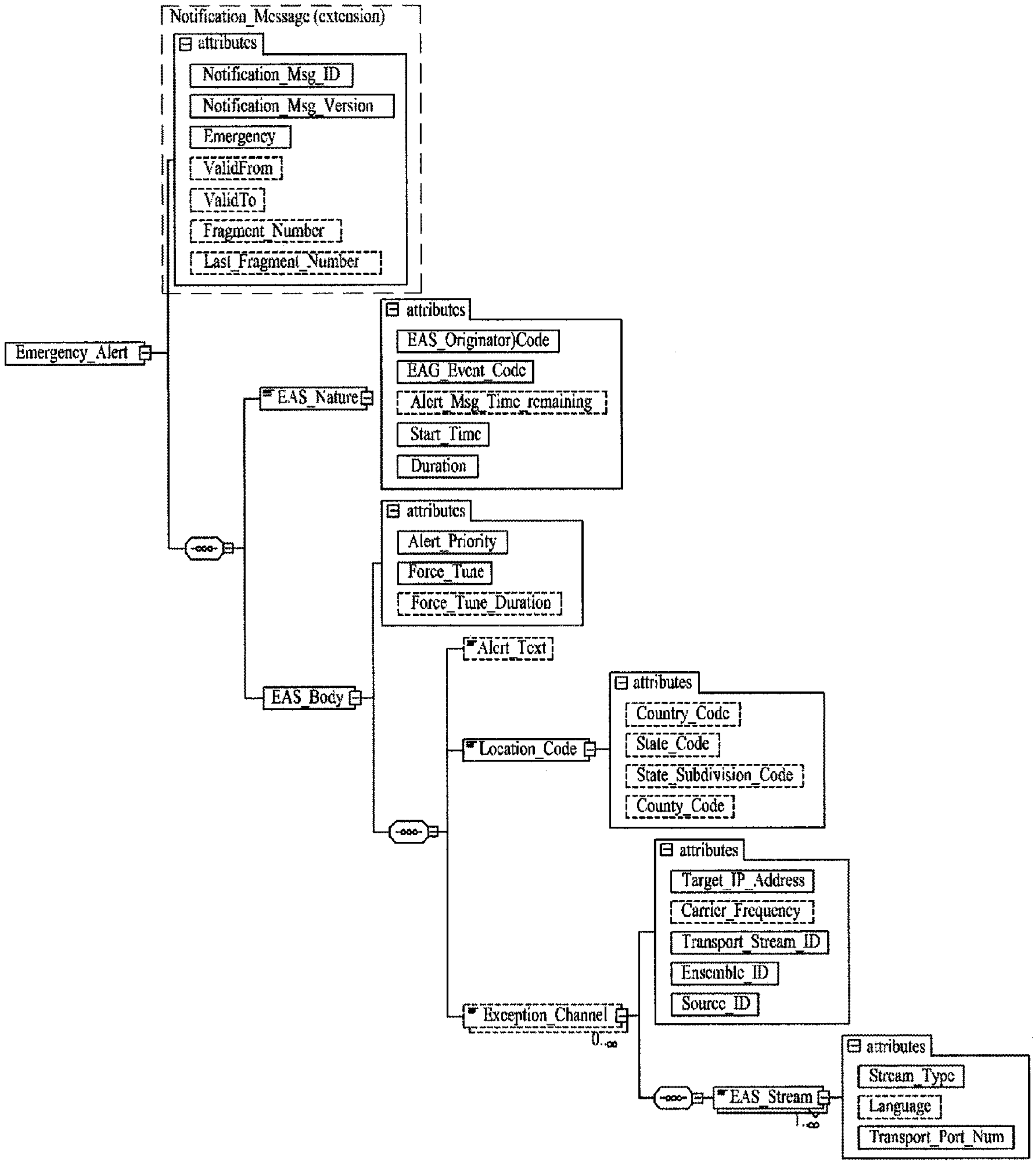
FIG. 39 is a diagram for an XML data structure of a notification message according to the present invention in case that the notification message transmitted on a notification channel has emergency attributes.

FIG. 39 is a diagram for an XML data structure of Emergency_Alert element which is a notification message according to the present invention in case that the notification message transmitted on a notification channel has emergency attributes, and FIG. 40 is a diagram of the Emergency_Alert element represented in XML schema form.

First of all, the Emergency_Alert notification message, i.e., the Emergency_Alert element can include Notification_Msg_ID field, Notification_Msg_Version_field, Emergency field, ValidFrom field, ValidTo field, Fragment_Number field and Last_Fragment_Number field, which are defined as attributes. For details of the respective fields, FIG. 35 can be referred to. And, the details are omitted in the following description.

The Emergency_Alert element can include lower elements such as EAS_Nature element and EAS_Body element.

The EAS_Nature element can include EAS_originator_code field, EAS_event_code field, Alert_message_time_remaining field, Start_time field and Duration field, which are defined as attributes.

The EAS_originator_code field indicates the entity for generating the emergency alert system (EAS).

The EAS_event_code field includes the information indicating the type of the EAS. For instance, it is able to indicate the importance of a specific emergency such as a large-scale earthquake, a medium-scale earthquake, a small-scale earthquake and the like together with a type of an emergency alert such as flood, earthquake, terror and the like.

The Alert_message_time_remaining field indicates the residual output time of the emergency alert message (EAM).

The Start_time field indicates the start time of the EAM event after 00 hours UTC, Jan. 6, 1980 in second units.

The Duration field indicates the duration of the emergency alert event in minute units.

Meanwhile, the EAS_Body element can include Alert_Priority field, Force_Tune field and Force_Tune_Duration field, which are defined as attributes.

The Alert_Priority field indicates the syntax for displaying the priority or the importance of the emergency.

A prescribed processing of a received emergency alert message is determined according to a value of the Alert_Priority field. In particular, whether to ignore the received emergency alert message unconditionally or on a specific condition only or whether to perform a force tune to an emergency broadcast channel (exception channel) included in the received emergency alert message is determined.

The Force_Tune field indicates that this EAS Message requires a receiving system to tune to the exception channel.

The Force_Tune_Duration field indicates a duration when a receiving system is forced to tune to an exception channel.

The EAS_Body element can include Alert_Text element, Location_Code element and Exception_Channel element, which are lower elements.

The Alert_Text element can include a content of a real emergency alert in a text format.

The Location_Code element can include Country_Code field, State_Code field, State_Subdivision_Code field and County_Code field, which are defined as attributes.

The Country_Code field indicates a code of a country associated with an emergency alert.

The State_Code field indicates a state or territory associated with an emergency alert.

The State_Subdivision_Code field may include 4-bit digits between 0~9 for defining a county subdivision.

The County_Code field indicates a specific county of the state associated with the emergency alert.

In the regional definition, regional titles according to the administrative district discrimination of U.S.A. are used, by which the scope of the present invention is non-limited.

The Exception_Channel element can include Target_IP_Address field, Carrier_Frequency field, Transport_Stream_ID field, Ensemble_ID field and Source_ID field, which are defined as attributes.

The Target_IP_Address field indicates a target IP address of an exception channel.

The Carrier_Frequency field indicates a carrier frequency of the exception channel.

The Ensemble_ID field indicates an identifier of an ensemble carrying the exception channel.

And, the Source_ID field indicates a virtual channel operating as an exception channel.

The Exception_Channel element can include an EAS_stream element as a lower element.

The EAS_stream element can include Stream_type field, Language field and Target_Port_Num field, which are defined as attributes.

The Stream_type field indicates a type of the EAS message stream.

The Language field indicates a language of the EAS message stream.

And, the Target_Port_Num field indicates a target UDP port number of the EAS message stream.

Meanwhile, the previously determined broadcast schedule may be modified due to various reasons. For instance, a start time of a program to be next broadcasted may be delayed behind an original time due to an extension of a professional baseball game broadcast relay or the like. If a broadcasted professional baseball game ends ahead of a due time, a start time of a next broadcast program may come earlier than a scheduled time.

Figure 41:
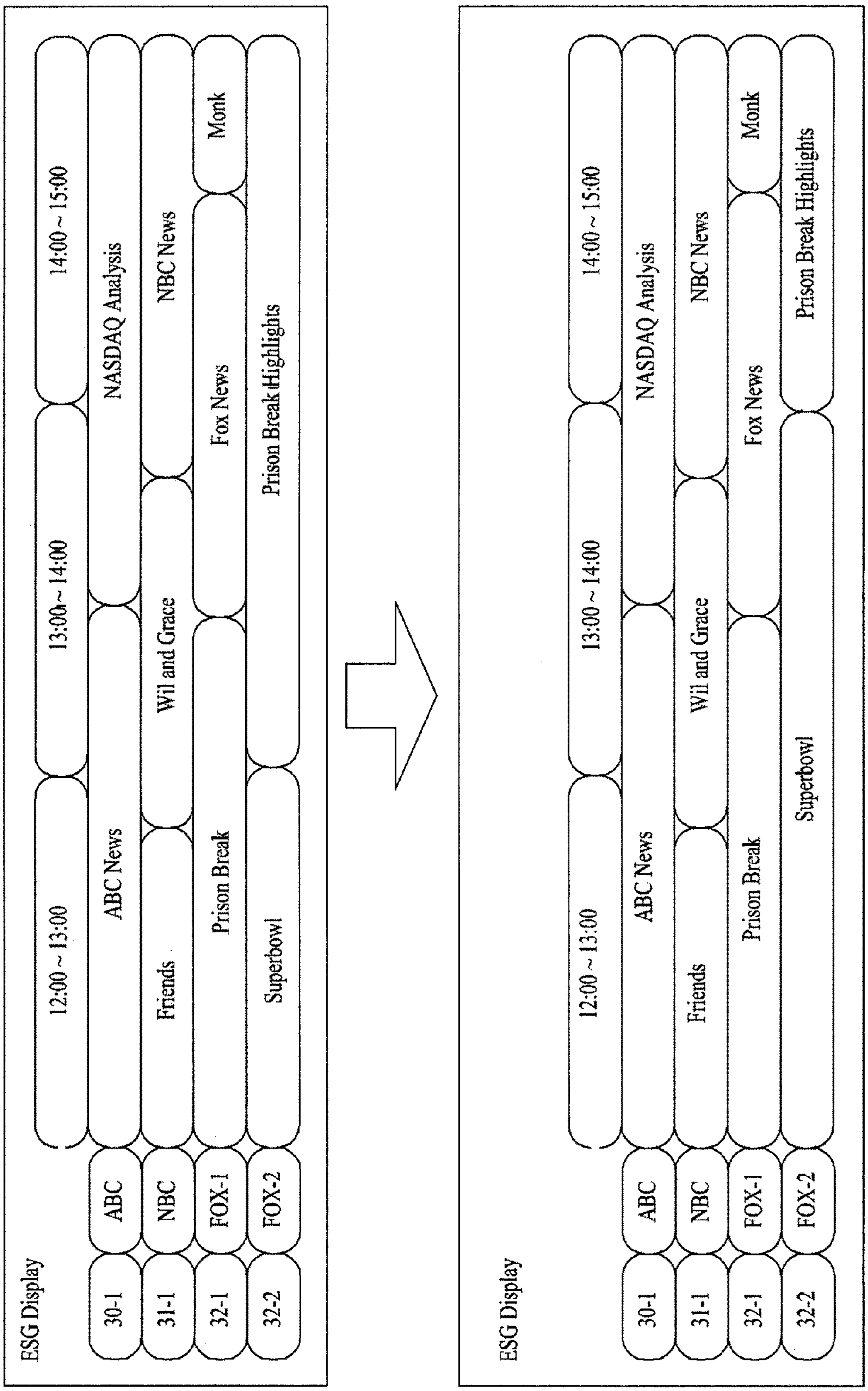
FIG. 41 is a diagram for an example that a determined broadcast schedule changes.

FIG. 41 is a diagram for an example that a determined broadcast schedule changes.

Referring to (a) of FIG. 41, it is scheduled that 'Superbowl' relay broadcast will be serviced on Channel 32-2 12:00 to 13:00. And, it is also scheduled that 'Prison Break' highlight is scheduled to be serviced on Channel 32-2 13:00 to 14:00. Referring to (b) of FIG. 41, it is observed that the schedule of the 'Superbowl' relay broadcast is changed into 12:00~14:00. And, it is also observed that the schedule of the 'Prison Break' highlight is changed into 14:00~15:00.

In this case, only if a receiving system knows the change content of the broadcast schedule, the receiving system is able to provide the correct guide information to a user.

As a method of announcing the broadcast schedule change to the receiving system, there is a method of transmitting ESG on EDC channel. If so, the receiving system is able to update previously stored ESG information by parsing the ESG.

Figure 42:
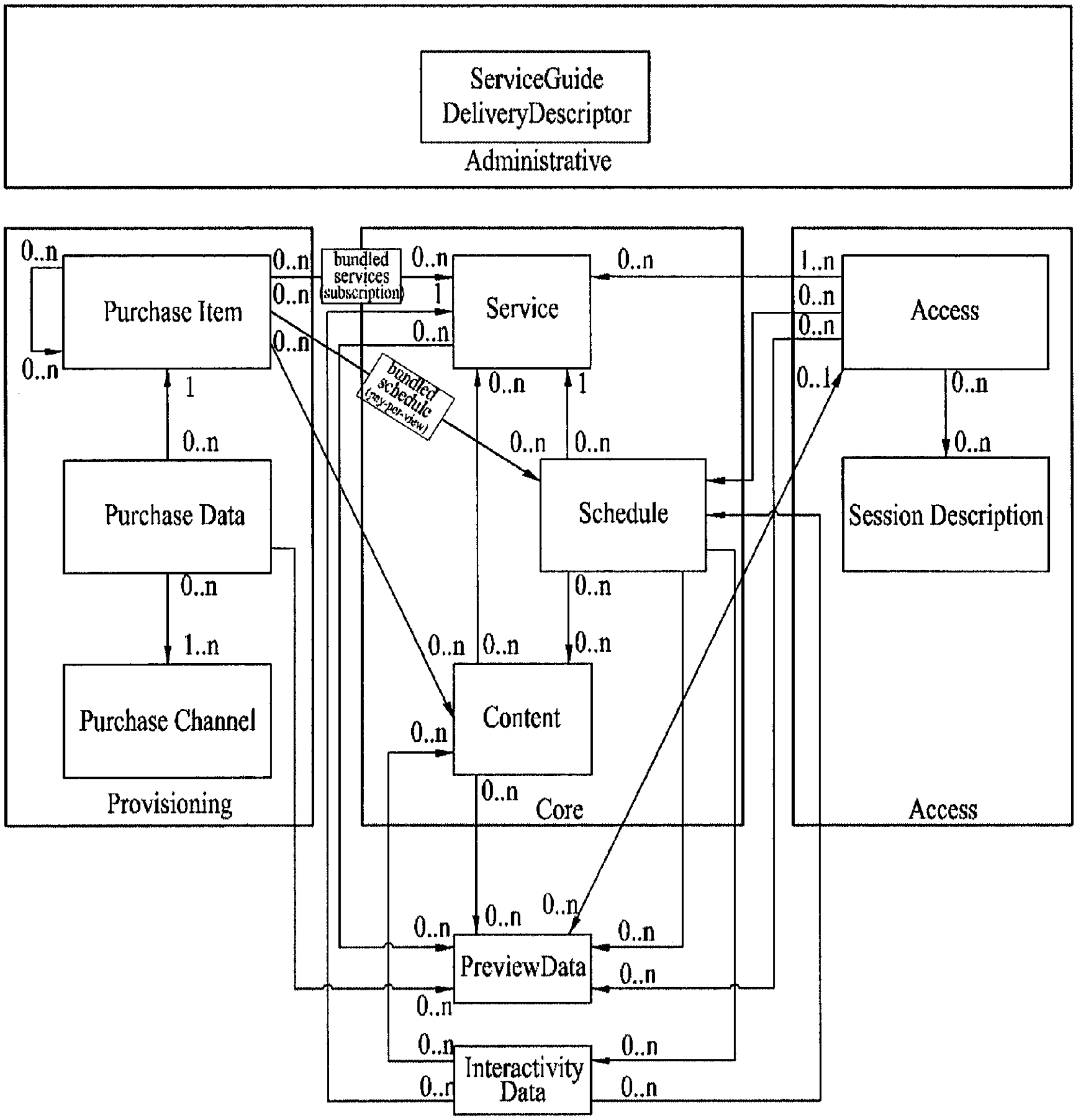
FIG. 42 is an exemplary diagram for a structure of an electronic service guide (ESG) according to one embodiment of the present invention.

FIG. 42 is an exemplary diagram for a structure of an electronic service guide (ESG) according to one embodiment of the present invention.

Referring to FIG. 42, an ESG fragment associated with schedule change information is a schedule fragment. And, this fragment refers to a service fragment and a content fragment.

In particular, if entry point information of ESG is transmitted by being included in an ensemble, a receiving system receives a service guide delivery descriptor (ServiceGuideDeliveryDescriptor), which is information for describing ESG, using the corresponding entry point information. Information on the structure and acquisition of the ESG can be obtained from the service guide delivery descriptor. Using this information, it is able to receive the ESG information.

The ESG is able to provide signaling information (or called 'announcement information') by a subdivided lower unit. And, the subdivided lower unit is named a fragment. The fragments used for the ESG can include Service fragment, Schedule fragment, Content fragment, Purchase Item fragment, Purchase Data fragment, Purchase Channel fragment, Access fragment, session description fragment, previewData fragment, interactiveData fragment and the like. Arrows shown in FIG. 42 indicate reference relations. According to this example, the purchase item fragment, the content fragment, the schedule fragment and the access fragment can refer to the service fragment. The schedule fragment associated with the schedule change information can refer to the service fragment and the content fragment. The number exemplarily shown above each of the arrows indicates the available number of lower unit information. And, the numeral indicates the available number of fragments.

Major fragments among the exemplary fragments are explained as follows.

First of all, the service fragment includes information on such a service provided to a user as a single conventional television channel.

The content fragment includes metadata for contents. For instance, A/V for contents, text, a type of an image and the like can be included in the content fragment.

The schedule fragment includes scheduling information on a single content. For instance, the scheduling information can include a broadcast time of the corresponding content.

The purchase item fragment includes item information associated with purchase.

The purchase data fragment includes information associated with a purchase of a service that can be purchased by a user.

The purchase channel fragment means an interface enabling a terminal or user to communicate with a purchase system. The purchase channel fragment includes information on management of a parameter relevant to a purchase system or a purchase channel.

The access fragment includes information associated with an access to a service or content.

Yet, in case that ESG information needs to be updated due to an unexpected program schedule change or the like, a method of transmitting ESG data on EDC channel should send a massive volume of ESG data. Hence, it takes so long for a receiving system to update ESG information, whereby ESG update and management are not efficiently performed.

In order for the present invention to operate the ESG update and management more efficiently, if ESG information needs to be updated due to an unexpected program schedule change or the like, the corresponding ESG update information is transmitted as a notification message on a notification channel.

Figure 43:
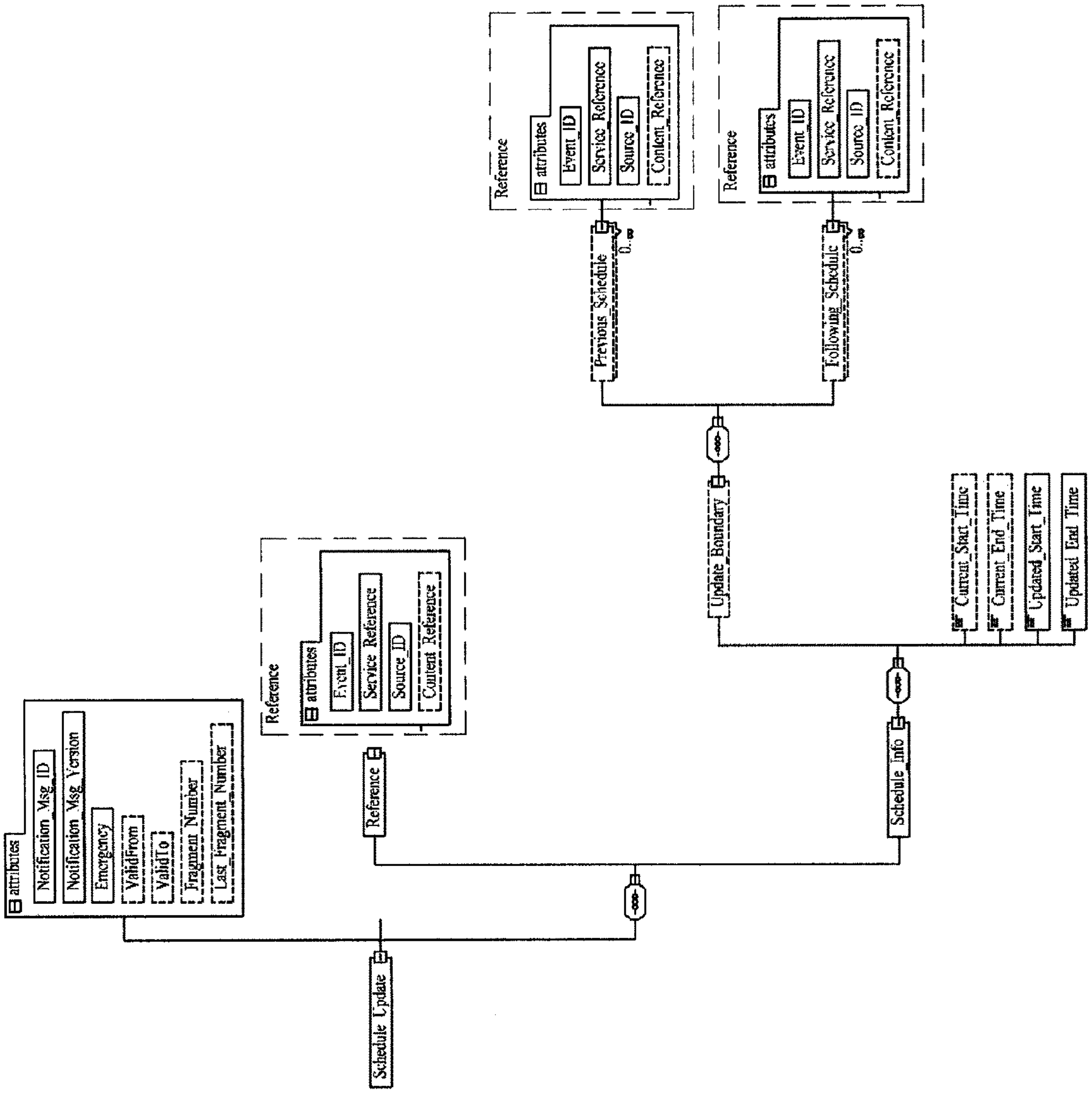
FIG. 43 is a diagram of an XML data structure when a notification message transmitted on a notification channel according to the present invention is the notification message containing ESG update information.

FIG. 43 is a diagram of an XML data structure of Schedule_Update element that is a notification message transmitted on a notification channel according to the present invention by containing ESG update information, and FIG. 44 is a diagram for representing the Schedule_Update element shown in FIG. 43 in an XML schema form.

Attributes of the Schedule_Update message, i.e., the Schedule_Update element can include Notification_Msg_ID field, Notification_Msg_Version field, Emergency field, ValidFrom field, ValidTo field, Fragment_Number field and Last_Fragment_Number field. Details of the respective fields can use those explained in FIG. 35, thereby being omitted in the following description.

The Schedule_Update field can include Reference element and Schedule_Info element as lower elements.

The Reference element can include Event_ID field, Service_Reference field, Source_ID field and Content_Reference field.

The Event_ID field indicates an identifier (ID) of a broadcast event the corresponding Schedule_Update element attempts to update. A schedule of a broadcast event having a corresponding Event_ID is updated by a corresponding Schedule_Update notification message.

The Service_Reference field indicates a reference for a virtual channel (MH service) on which a broadcast event to be updated by a corresponding Schedule_Update notification message is being broadcasted.

The Source_ID field indicates a source_ID of a virtual channel (MH service) on which a broadcast event to be updated by a corresponding Schedule_Update notification message is being broadcasted.

In case that a schedule fragment of a broadcast event that a corresponding Schedule_Update notification message attempts to update refers to a content fragment, the Content_Reference field indicates a corresponding reference.

The Schedule_Info element can include Update_Boundary element, Current_Start_Time element, Current_End_Time element, Updated_Start_Time element and Updated_End_Time element.

The Update_Boundary element enables a receiving system to appropriately update a service guide in a manner of information the receiving system of a previous/following broadcast event that is affected when a corresponding Schedule_Update notification message changes a schedule of a single broadcast event.

For this, the Update_Boundary element can include Previous_Schedule element and Following_Schedule element as lower elements.

The Previous_Schedule element describes an event ahead of an event that a corresponding Schedule_Update notification message changes a schedule of the event or an event affected by a schedule change of a corresponding notification message.

The Following_Schedule element describes an event after an event that corresponding Schedule_Update notification message changes a schedule of the corresponding event or an event of which schedule is affected by a schedule change of a corresponding notification message.

For this, each of the Previous_Schedule element and the Following_Schedule element can include Event_ID field, Service_Reference field, Source_ID field and Content_Reference field, which are defined as attributes. For details of the respective fields, the description for the respective fields described as the attributes of the Reference element can be referred to. Hence, the corresponding details will be omitted in the following description.

The Current_Start_Time element among the lower elements of the Schedule_Info element indicates a current start time of a broadcast event a corresponding Schedule_Update notification message attempts to update.

The Current_End_Time field indicates a current end time of a broadcast event that corresponding Schedule_Update notification message attempts to update.

The Updated_Start_Time field indicates a start time after an update of a broadcast event that corresponding Schedule_Update notification message attempts to update.

The Updated_End_Time field indicates an end time after an update of a broadcast event that corresponding Schedule_Update notification message attempts to update.

Figure 45:
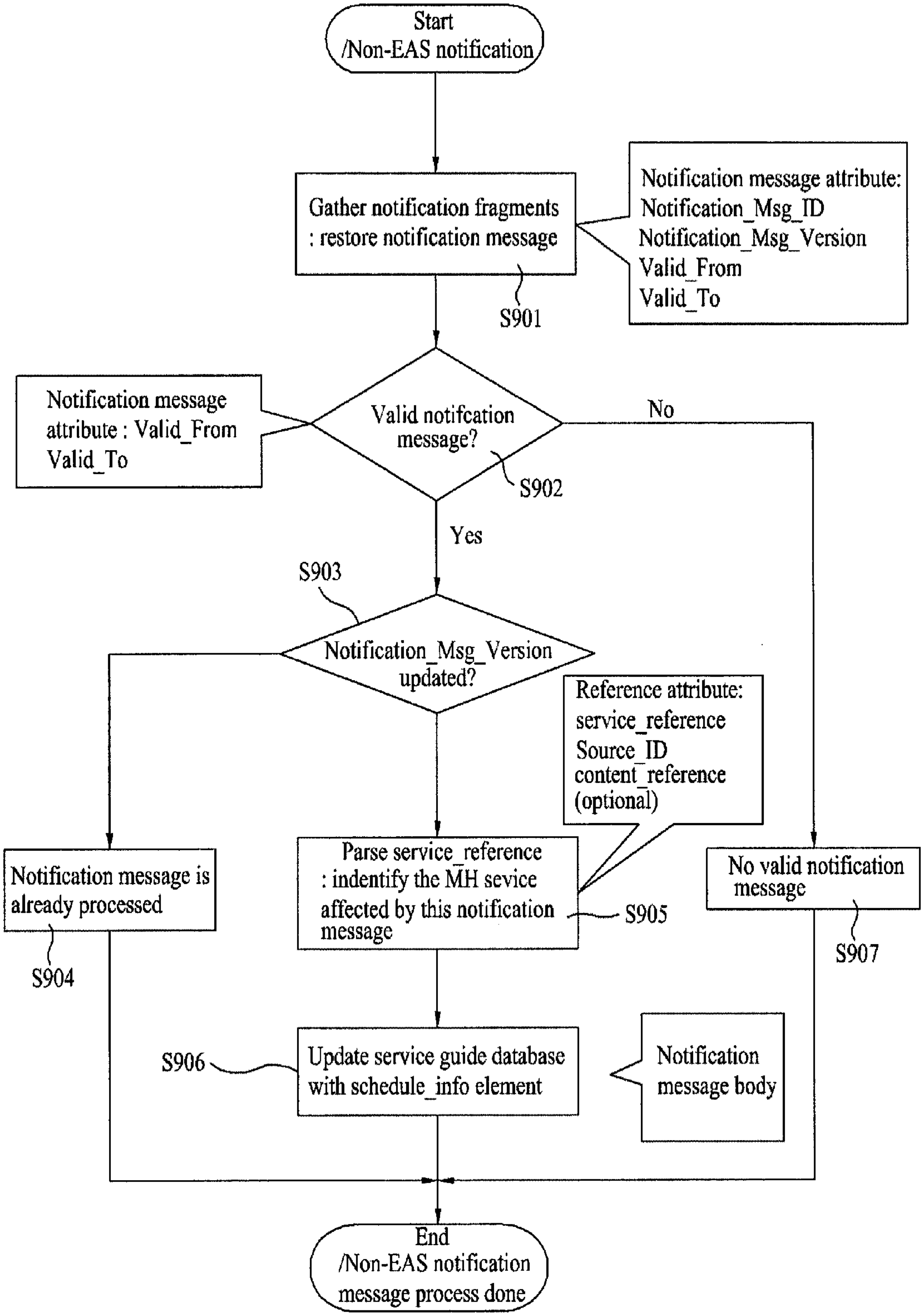
FIG. 45 is a flowchart for a method of processing Schedule_Update notification message accessed according to one embodiment of the present invention.

FIG. 45 is a flowchart for a method of processing Schedule_Update notification message accessed according to one embodiment of the present invention.

Referring to FIG. 45, if a Schedule_Update notification message is accessed from a corresponding notification channel, the Schedule_Update notification message is configured by gathering notification fragments (S901). The Schedule_Update notification message can include Notification_Msg_ID field, Notification_Msg_Version field, Emergency field, ValidFrom field, ValidTo field, Fragment_Number field and Last_Fragment_Number field, which are defined as attributes. If the Fragment_Number field and the Last_Fragment_Number field are parsed, it is able to configure a Schedule_Update notification message by gathering at least one or more fragments.

If the Schedule_Update notification message is configured in the step S901, it is checked whether the configured Schedule_Update notification message is valid (S902). The validity or invalidity of the notification message can be obtained by parsing the ValidFrom field and the ValidTo field.

If the step S902 checks that the Schedule_Update notification message is valid, it is checked whether a version of the Schedule_Update notification message is updated in a manner of parsing the Notification_Msg_Version field (S903). If the step S903 checks that the version of the notification message is not updated, it means the same Schedule_Update notification message is already being processed. Hence, the accessed Schedule_Update notification message is ignored (S904).

Meanwhile, if the step S903 checks that the version of the Schedule_Update notification message was updated, an MH service affected by the accessed Schedule_Update notification message is identified (S905). The MH service is a broadcasting event that the accessed Schedule_Update notification message desires to update. The identification of the MH service can be obtained by parsing the Reference element of the accessed Schedule_Update notification message. The Reference element can include Event_ID field, Service_Reference field, Source_ID field and Content_Reference field, which are defined as attributes. Optionally, the Reference element can further include Content_Reference field.

If the MH service is identified in the step S905, a schedule relevant service guide database is updated by parsing Schedule_Info element of the accessed Schedule_Update notification message (S906).

In particular, if the Current_Start_Time element, the Current_End_Time element, the Updated_Start_Time element and the Updated_End_Time element of the Schedule_Info element are parsed, it is able to know a current start time and end time and a start time and end time after an update of the identified MH service. If current time information and the time information after the update of the MH service are compared to each other, it is able to know schedule information of a previous and/or following event affected by the schedule change of the MH service. And, it is able to know an identifier (Event_ID) of the previous and/or following event affected by the schedule change of the MH service in a manner of parsing Previous_Schedule element and Following_Schedule element.

The schedule information of the above schedule-changed current event and the schedule information of the previous and/or following event affected by the schedule change of the current event are updated in the schedule relevant service guide database only. According to one embodiment of the present invention, in order to update the schedule information of the corresponding event only, a corresponding event identifier parsed from each element is referred to.

Meanwhile, if the step S902 checks that the Schedule_Update notification message is not valid, the accessed Schedule_Update notification message is ignored (S907).

According to another embodiment of the present invention, while a schedule relevant service guide database is being updated, schedule change contents can be automatically notified to a user. For instance, if a schedule of ‘Superbowl’ broadcast relay service is changed into 12:00~14:00 and a schedule of ‘Prison Break Highlights’ service is changed into 14:00~15:00, those program schedule changes are displayed on a portion of a screen by OSD (on screen display). Therefore, a user is automatically aware of the program schedule changes without selecting an ESG menu.

As mentioned in the foregoing description of the present invention, a notification message is received using a notification dedicated channel and is then processed. In doing so, ESG update information or EAS data according to an emergency can be delivered on the notification channel. Therefore, if an emergency takes place in the course of a mobile service, an emergency alert service can be quickly provided to a user. Moreover, if a broadcast schedule is changed, ESG update is quickly performed. Therefore, a user can be quickly provided with a correct broadcast schedule despite an unexpected change of a broadcast schedule.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A receiving system comprising:

a tuner for receiving a broadcast signal having data groups, wherein each of the data groups includes mobile service data, known data sequences, fast information channel (FIC) data, and transmission parameter channel (TPC) data, wherein the FIC data includes binding information between a service of the mobile service data and an ensemble, wherein the ensemble carries a signaling information table and includes either a primary ensemble or a secondary ensemble;

a demodulator for demodulating the received broadcast signal;

a first decoder for decoding the FIC data and the TPC data from the demodulated broadcast signal; and a second decoder for decoding a Reed Solomon (RS) frame including the mobile service data and the signaling information table from the demodulated broadcast signal, wherein the RS frame includes a plurality of transport packets, wherein each of the plurality of transport packets includes a header and a payload, wherein the payload includes at least one Internet protocol (IP) datagram, wherein the header includes a pointer field indicating a start position of a new IP datagram in the payload, wherein the RS frame belongs to either the primary ensemble or the secondary ensemble, wherein the FIC data includes an ensemble identifier to identify the ensemble, and wherein the TPC data includes FIC version information for identifying an update of the FIC data.

2. The receiving system of claim 1, wherein 7 least significant bits of the ensemble identifier correspond to a parade identifier identifying a parade that carries at least the primary ensemble or the secondary ensemble.

3. The receiving system of claim 2, wherein the primary ensemble is identified by the ensemble identifier when a most significant bit (MSB) of the ensemble identifier is set to 0.

4. The receiving system of claim 2, wherein the secondary ensemble is identified by the ensemble identifier when a most significant bit (MSB) of the ensemble identifier is set to 1.

5. The receiving system of claim 1, wherein the signaling information table is received by at least one section, each of the at least one section comprising a section header and a section body, and wherein the section header includes a table identifier and the ensemble identifier, and the section body includes access information of the mobile service data.

6. The receiving system of claim 5, wherein the signaling information table is differentiated by using the table identifier and the ensemble identifier.

7. The receiving system of claim 1, wherein:

each of the data groups further includes a plurality of data blocks; and the FIC data and the TPC data are inserted into a specific data block of the plurality of data blocks.

8. The receiving system of claim 1, wherein at least two of the known data sequences have different lengths.

9. The receiving system of claim 1, wherein the FIC data include a plurality of FIC segments, wherein each of the plurality of FIC segments includes a FIC segment header and a FIC segment payload, wherein one of the plurality of FIC segments is transmitted in a group, and wherein one of the FIC segment payloads includes the ensemble identifier.

10. A method of processing broadcast data in a receiving system, the method comprising:

receiving, by a tuner, a broadcast signal having data groups, wherein each of the data groups includes mobile service data, known data sequences, fast information channel (FIC) data, and transmission parameter channel (TPC) data, wherein the FIC data includes binding information between a service of the mobile service data and an ensemble, wherein the ensemble carries a signaling information table and includes either a primary ensemble or a secondary ensemble;

demodulating, by a demodulator, the received broadcast signal;

decoding, by a first decoder, the FIC data and the TPC data from the demodulated broadcast signal; and decoding, by a second decoder, a Reed Solomon (RS) frame including the mobile service data and the signaling information table from the demodulated broadcast signal, wherein the RS frame includes a plurality of transport packets, wherein each of the plurality of transport packets includes a header and a payload, wherein the payload includes at least one Internet protocol (IP) datagram, wherein the header includes a pointer field indicating a start position of a new IP datagram in the payload, wherein the RS frame belongs to either the primary ensemble or the secondary ensemble, wherein the FIC data includes an ensemble identifier to identify the ensemble, and wherein the TPC data includes FIC version information for identifying an update of the FIC data.

11. The method of claim 10, wherein 7 least significant bits of the ensemble identifier correspond to a parade identifier identifying a parade that carries at least the primary ensemble or the secondary ensemble.

12. The method of claim 11, wherein the primary ensemble is identified by the ensemble identifier when a most significant bit (MSB) of the ensemble identifier is set to 0.

13. The method of claim 11, wherein the secondary ensemble is identified by the ensemble identifier when a most significant bit (MSB) of the ensemble identifier is set to 1.

14. The method of claim 10, wherein the signaling information table is received by at least one section, each of the at least one section comprising a section header and a section body, and wherein the section header includes a table identifier and the ensemble identifier, and the section body includes access information of the mobile service data.

15. The method of claim 14, wherein the signaling information table is differentiated by using the table identifier and the ensemble identifier.

16. The method of claim 10, wherein:

each of the data groups further includes a plurality of data blocks; and the FIC data and the TPC data are inserted into a specific data block of the plurality of data blocks.

17. The method of claim 10, wherein at least two of the known data sequences have different lengths.

18. The method of claim 10, wherein the FIC data include a plurality of FIC segments, wherein each of the plurality of FIC segments includes a FIC segment header and a FIC segment payload, wherein one of the plurality of FIC segments is transmitted in a group, and wherein one of the FIC segment payloads includes the ensemble identifier.

* * * * *